(12) United States Patent
Arai et al.

(10) Patent No.: US 8,038,254 B2
(45) Date of Patent: Oct. 18, 2011

(54) INK SET AND IMAGE FORMING METHOD

(75) Inventors: Yoshimitsu Arai, Kanagawa (JP); Mika Imamura, Kanagawa (JP); Hiroshi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 91 days.

(21) Appl. No.: 12/533,021

(22) Filed: Jul. 31, 2009

(65) Prior Publication Data
US 2010/0040782 A1 Feb. 18, 2010

(30) Foreign Application Priority Data

Aug. 14, 2008 (JP) ................................. 2008-208997

(51) Int. Cl.
*B41J 2/165* (2006.01)
*C09D 11/10* (2006.01)
(52) U.S. Cl. ......................................... 347/28; 523/160
(58) Field of Classification Search .................. 523/160; 347/28
See application file for complete search history.

(56) References Cited

U.S. PATENT DOCUMENTS

| 2005/0288391 | A1* | 12/2005 | Beach et al. ................... 523/160 |
| 2006/0203055 | A1* | 9/2006 | Doi ................................. 347/96 |
| 2007/0222811 | A1* | 9/2007 | Yanagi ............................ 347/21 |
| 2009/0246382 | A1* | 10/2009 | Hirato et al. ................... 427/265 |
| 2009/0315926 | A1* | 12/2009 | Yamanobe ........................ 347/6 |
| 2010/0041816 | A1* | 2/2010 | Ikoshi et al. ................... 524/503 |
| 2010/0047456 | A1* | 2/2010 | Kariya ........................... 427/265 |

FOREIGN PATENT DOCUMENTS
JP 2007-119658 A 5/2007
* cited by examiner

*Primary Examiner* — David W Wu
*Assistant Examiner* — Vu A Nguyen
(74) *Attorney, Agent, or Firm* — SOLARIS Intellectual Property Group, PLLC

(57) ABSTRACT

The invention provides an ink set having at least an ink composition and a maintenance liquid. The ink composition comprises a pigment (i). The maintenance liquid comprises one or more solvents (ii) having a solubility parameter value of 27.5 or less. The content of the one or more solvents (ii) is 50 weight % or more with respect to a total solvent content of the maintenance liquid. The invention further provides a method of forming an image using the ink set including at least applying, with a liquid applying device, the ink composition to a recording medium, and applying a maintenance liquid to the liquid applying device.

19 Claims, No Drawings

INK SET AND IMAGE FORMING METHOD

CROSS-REFERENCE TO RELATED APPLICATION

This application claims priority under 35 USC 119 from Japanese Patent Application No. 2008-208997 filed on Aug. 14, 2008, the disclosure of which is incorporated by reference herein.

BACKGROUND OF THE INVENTION

1. Field of Invention

The invention relates to an ink set and an image forming method.

2. Description of the Related Art

An inkjet recording method has become widely used from the viewpoints that recording can be carried out on various recording materials, the hardware (device) is relatively inexpensive and compact and is superior in quietness. With recent development of in inkjet recording, so-called "photo-like" high quality images have become possible by using the inkjet recording method.

SUMMARY

In general, ink jet recording methods that use a pigment ink have better stability than ink jet recording methods that use a dye-based ink.

However, when moisture in a pigment ink evaporates and the pigment ink solidifies, since the pigment ink is left as a solid and not re-dissolved, a nozzle end portion of an ink jet head may become clogged, which may cause non-jetting of ink. Further, if ink solidifies at a cap or a wiping portion or the like, wiping may become difficult, which can increase maintenance burdens.

In view of addressing these phenomena, an ink jet recording maintenance liquid has been disclosed that includes a resin solvent having a solubility in water at 25° C. of 3 weight % or more at a content of 0.1 weight % to 10 weight %, and a humectant at a content of 1 weight % to 50 weight %. (see, for example, Japanese Patent Application Laid-Open (JP-A) No. 2007-119658).

However, the ink jet recording maintenance liquid of JP-A No. 2007-119658 does not exhibit a sufficient cleaning effect when resin fine particles in an ink are increased, or when a solvent with a low SP value (solubility parameter value) is used as an ink solvent.

The present invention was made in light of the above issues. In embodiments, the present invention provides an ink set which is excellent in maintainability of a nozzle surface of an ink jet head and which can form high-quality images.

In embodiments, the present invention further provides an image forming method using the ink set which is excellent in maintainability of a nozzle surface of an ink jet head and which can form high-quality images.

Namely, one aspect of the present invention is an ink set comprising an ink composition and a maintenance liquid, wherein the ink composition comprises a pigment (i); the maintenance liquid comprises one or more solvents (ii) having a solubility parameter (SP) value of 27.5 or less; and the content of the one or more solvents (ii) is 50 weight % or more with respect to a total solvent content of the maintenance liquid. Another aspect of the present invention is a method of forming an image using the ink set of claim 1, the method comprising; applying, with a liquid applying device, the ink composition to a recording medium; and applying a maintenance liquid to the liquid applying device.

DETAILED DESCRIPTION

The ink set of one aspect of the present invention contains at least an ink composition and a maintenance liquid. The ink composition contains at least a pigment (i). The maintenance liquid contains at least a solvent (ii) having an SP value of 27.5 or less. The content of the solvent (ii) is 50 weight % or more with respect to a total solvent content of the maintenance liquid.

The use of the maintenance liquid having the specific content of solvent having the specific SP value in the ink set may lead to excellent maintainability of a liquid applying device such as an ink jet head having a nozzle surface, and high-quality images.

Maintenance Liquid

The maintenance liquid of the present invention contains a solvent (ii) having an SP value of 27.5 or less at a content of 50 weight % or more with respect to the total solvent content of the maintenance liquid.

The use of the solvent having an SP value of 27.5 or less at a content of 50 weight % or more with respect to the total solvent content of the maintenance liquid may lead to maintainability.

The maintenance liquid preferably contains water in addition to the above solvent, but the maintenance liquid is otherwise not particularly limited. In view of improving removability of solidified ink from an ink jet head, the maintenance liquid may further contain a controlling agent to control pH, and/or a surfactant, and further additives may also be contained as necessary, such as an antibacterial agent, a rust inhibitor, a preservative, or a viscosity modifier.

Solvent (ii) having an SP value of 27.5 or less

The content of one or more solvents (ii) having an SP value of 27.5 or less used in the present invention (hereinafter simply referred as a "solvent (ii)") is 50 weight % or more with respect to the total solvent content of the maintenance liquid. In view of improving removability of solidified ink from an ink jet head, the content is preferably 60 weight % or more, more preferably 70 weight % or more, and even more preferably 80 weight % or more.

If the content is less than 50 weight %, the function of removing solidified ink may not be sufficiently obtained.

The solubility parameter (SP) value as described in the invention represents the square root of molecular cohesion energy, and may be calculated according to the method indicated in R. F. Fedors, Polymer Engineering Science, 14, p. 147 (1967), the disclosure of which is included by reference herein.

Specific examples of the compound preferable as the solvent having an SP value of 27.5 or less of the invention are indicated below; however, the present invention is not limited to these. SP values of the compounds are indicated in parentheses respectively.

Diethylene glycol monomethylether (22.4)
Diethylene glycol monobutylether (21.5)
Triethylene glycol monobutylether (21.1)
Dipropylene glycol monomethylether (21.3)
Dipropylene glycol (27.2)

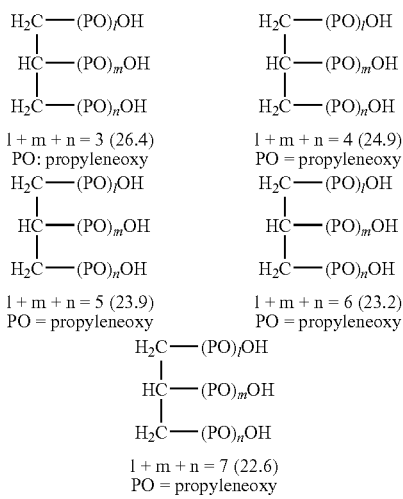

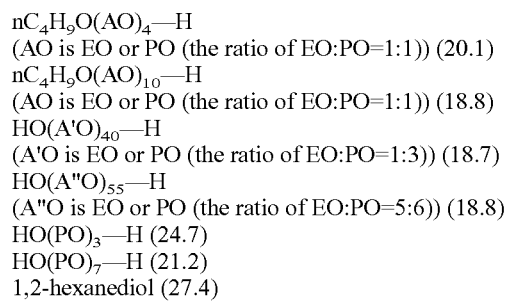

$nC_4H_9O(AO)_4$—H
(AO is EO or PO (the ratio of EO:PO=1:1)) (20.1)
$nC_4H_9O(AO)_{10}$—H
(AO is EO or PO (the ratio of EO:PO=1:1)) (18.8)
$HO(A'O)_{40}$—H
(A'O is EO or PO (the ratio of EO:PO=1:3)) (18.7)
$HO(A''O)_{55}$—H
(A''O is EO or PO (the ratio of EO:PO=5:6)) (18.8)
$HO(PO)_3$—H (24.7)
$HO(PO)_7$—H (21.2)
1,2-hexanediol (27.4)

In the above formulae, EO represents an ethyleneoxy group, and PO represents a propyleneoxy group.

These compounds can be respectively used singly or in combination of two or more thereof.

The content of the solvent (ii) is 50 weight % or more with respect to the total amount of solvent(s) contained in the maintenance liquid. In view of improving removability and swellability of solidified ink, the maintenance liquid preferably contains one or more solvents having a solubility parameter value of 24 or less at a content of 50 weight % or more, and more preferably contains one or more solvents having a solubility parameter value of 22 or less at a content of 50 weight % or more, with respect to a total solvent content of the maintenance liquid.

A solvent which is different from the solvent (ii) may be further employed as long as the effect of the invention is not impaired thereby.

Examples of a water-soluble organic solvent which can be additionally used as such other solvent include polyhydric alcohols including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; so-called solid wetting agents including saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; and ureas; alkyl alcohols having 1 to 4 carbon atoms such as ethanol, methanol, butanol, propanol or isopropanol;

glycol ethers such as ethyleneglycol monomethyl ether, ethyleneglycol monoethyl ether, ethyleneglycol monobutyl ether, ethyleneglycol monomethyl ether acetate, diethyleneglycol monomethyl ether, diethyleneglycol monoethyl ether, diethyleneglycol mono-n-propyl ether, ethyleneglycol mono-iso-propyl ether, diethyleneglycol mono-iso-propyl ether, ethyleneglycol mono-n-butyl ether, ethyleneglycol mono-t-butyl ether, diethyleneglycol mono-t-butyl ether, 1-methyl-1-methoxybutanol, propyleneglycol monomethyl ether, propyleneglycol monoethyl ether, propyleneglycol mono-t-butyl ether, propyleneglycol mono-n-propyl ether, propyleneglycol mono-iso-propyl ether, dipropyleneglycol monomethyl ether, dipropyleneglycol monoethyl ether, dipropyleneglycol mono-n-propyl ether or dipropyleneglycol mono-iso-propyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. One or more among these solvents may be employed as the other solvent.

A polyhydric alcohol can be preferably employed as an anti-drying agent and/or a wetting agent. Examples of the polyhydric alcohol include glycerin, ethyleneglycol, diethyleneglycol, triethyleneglycol, propyleneglycol, dipropyleneglycol, tripropyleneglycol, 1,3-butanediol, 2, 3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. One or more among these solvents may be employed as the other solvent.

A polyol compound can be preferably employed as a penetrating agent.

Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, or 2,2,4-trimethyl-1,3-pentanediol. Among these compounds, 2-ethyl-1,3-hexanediol and 2,2,4-trimethyl-1,3-pentanediol are preferable.

In view of improving removability of solidified ink, the content of the solvent (ii) is preferably 5 weight % or more, more preferably from 5 weight % to 70 weight %, and further preferably from 10 weight % to 50 weight %, with respect to the amount of the maintenance liquid.

The maintenance liquid preferably contains water. There is no particular limitation to the water contained in the maintenance liquid. In view of stability and convenience in use of the maintenance liquid, the content of the water can be preferably from 10 weight % to 99 weight %, more preferably from 30 weight % to 80 weight %, and further preferably from 50 weight % to 70 weight %, with respect to the amount of the maintenance liquid.

Surfactant

The maintenance liquid employed in the invention may contain a surfactant as a surface tension adjusting agent.

Examples of the surface tension adjusting agent include a nonionic surfactant, a cationic surfactant, an anionic surfactant, and a betaine surfactant. An amount of the surface tension adjusting agent is preferably adjusted so as to set the surface tension of the maintenance liquid to be from 20 mN/m to 50 mN/m, more preferably from 20 mN/m to 40 mN/m, and still more preferably from 25 mN/m to 35 mN/m, in consideration of sufficient cleaning of an inkjet head.

A compound having a structure in which a hydrophilic moiety and a hydrophobic moiety are included in a molecule thereof can be effectively used as the surfactant. Any of an anionic surfactant, a cationic surfactant, an amphoteric surfactant, and a nonionic surfactant can be used. The polymer substance (polymer dispersant) can be also used as the surfactant.

Examples of the anionic surfactant include sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctylsulfosuccinate, a sodium polyoxyethylene alkylether sulfate, a sodium polyoxyethylene alkylphenylether sulfate, sodium dialkylsulfosuccinate, sodium stearate, sodium oleate, and sodium t-octylphenoxyethoxy-polyethoxyethyl sulfate. The anionic surfactant may be used singly, or in combination of two or more thereof.

Examples of the nonionic surfactant include acetylenediol compounds such as an acetylenediol ethyleneoxide adducts, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

In view of preventing aggregation reaction with ink, nonionic surfactants and anionic surfactants are preferable, and in particular, acetylenediol compounds, sodium alkyl carboxylate and sodium alkyl sulfonate are preferable.

The addition amount of the surfactants to be added to the maintenance liquid employed in the invention is not specifically limited, although it is preferably from 0.1 weight % or more, more preferably from 0.5 weight % to 10 weight %, and still more preferably from 1 weight % to 3 weight % in consideration of cleaning property.

Other Components

The maintenance liquid employed the invention may further contain other additives. Examples of such other additives include known additives such as an antifungal agent, a pH adjuster, an antirust agent, an antiseptic agent, or a viscosity adjustment agent.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the i maintenance liquid is preferably from 0.02 weight % to 1.00 weight %.

The pH adjuster is not specifically limited as long as the pH adjuster can set a pH value of the ink composition to a desired value without exerting an adverse influence on the cleaning effect by the maintenance liquid. The pH adjuster may be selected appropriately in accordance with the purpose. Examples of the pH adjuster include alcohol amines such as diethanlol amine, triethanol amine, or 2-amino-2-ethyl-1,3-propanediol; alkali metal hydroxides such as lithium hydroxide, sodium hydroxide, or potassium hydroxide; ammonium hydroxides such as ammonium hydroxide or quaternary ammonium hydroxide; phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Physical Properties and the Like of Maintenance Liquid

The maintenance liquid used in the invention is preferably a liquid that does not cause coagulation when mixed with the ink composition used in the invention. This is because if coagulation is caused, components such as pigment in the ink composition will further solidify at an ink jet head so as to reduce the effect of the invention.

The pH of the maintenance liquid is not particularly limited. In view of rust-proofing of an ink jet recording apparatus and preventing degradation of a liquid-repellant film of a head, the pH of the maintenance liquid is preferably in the range of from 6 to 10, and more preferably in the range of from 7 to 9.

The viscosity of the maintenance liquid used in the invention at 20° C. is, considering operability, preferably from 1 mPa·s to 1000 mPa·s, more preferably from 1 mPa·s to less than 500 mPa·s, and even more preferably from 2 mPa·s to less than 100 mPa·s. The method of measuring viscosity in the invention is similar to the method described in the section on measuring viscosity of coagulation liquid described below.

The maintenance liquid employed in the invention is preferably a substantially colorless liquid that contains substantially no pigment.

The solid content of the maintenance liquid at 25° C. is not particularly limited. In view of preventing forming solid residue left after cleaning, it is preferably 5 weight % or less, and more preferably 2 weight % or less.

Ink Composition

The ink composition used in the invention is an ink composition containing the pigment (i). Apart from containing water in addition to the pigment (i), the ink composition is not particularly limited, although it preferably contains one or more solvents with an SP value of 27.5 or less, polymer particles and/or the like.

(i) Pigment

The ink composition employed in the invention contains at least one pigment.

The pigment used in the invention is not specifically limited, and may be appropriately selected depending on the purposes. For example, the pigment may be either an organic pigment or an inorganic pigment, or both of these can be used in combination.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinofraron pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Specific examples of a carbon black, which is an inorganic pigment of black color, include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 and RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names, manufactured by Degussa); and No. 25, No. 33, No. 40, No. 45, No. 47, No. 52, No. 900, No. 2200B, No. 2300, MCF-88, MA600, MA7, MA8 and MA100 (trade names, manufactured by Mitsubishi Chemical Corporation), although the black pigment employable in the invention is not limited thereto.

Organic pigments usable in the invention include yellow ink pigments such as C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C.I. Pigment Blue 15:3 is particularly preferable.

The pigment may be used singly or in combination of two or more thereof, each of which may be selected from the above classes of pigments and may belong to the same class as each other or different classes from each other.

The pigment used in the invention is preferably selected from the following water-dispersible pigments (1) to (4), from the viewpoint of the stability and ejection stability of the ink composition.

Water Dispersible Pigment

Examples of the water dispersible pigment include the following classes (1) to (4):

(1) An encapsulated pigment: a polymer emulsion formed by incorporating a pigment into polymer particles; more specifically, in the encapsulated pigment, pigment particles respectively have a resin layer formed of a hydrophilic water-insoluble resin which covers the surface of the pigment particle and imparts hydrophilicity to the pigment particle by its presence so that the pigment particles are dispersed in water.

The encapsulated pigment can be formed by, for example, by phase inversion emulsification.

(2) A self-dispersible pigment: a pigment having at least one hydrophilic group on a surface thereof and exhibiting at least one of water-dispersibility or water-solubility in the absence of a dispersant; more specifically, the pigment is prepared by subjecting the surfaces of pigment particles (such as carbon black particles) to an oxidizing treatment so as to impart hydrophilicity to the pigment particles and so as to enable the pigment itself to disperse in water.

(3) A resin dispersed pigment: a pigment dispersed using a water-soluble polymer compound having a weight average molecular weight of 50,000 or less.

(4) A surfactant-dispersed pigment: a pigment dispersed using a surfactant.

Among these pigments, the encapsulated pigment (1), the self-dispersible pigment (2) and the resin dispersed pigment (3) are preferable, and the encapsulated pigment (1) and the resin dispersed pigment (3) are particularly preferable.

Encapsulated Pigment

The resin used in the encapsulated pigment (1) is not specifically limited, although it is preferably a polymer compound that is self-dispersible or dissolvable in a mixed solvent of water and a water-soluble organic solvent and that has an anionic (acidic) group. In general, the number average molecular weight of the resin is preferably in the range of about 1,000 to about 100,000, and particularly preferably in the range of about 3,000 to about 50,000. The resin is preferably a resin that can dissolve in an organic solvent to form a solution. When the number average molecular weight of a resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers and mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

Self-Dispersible Pigment

The self-dispersible pigment (2) is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the expression "can be dispersed in an aqueous medium without a dispersant", indicates a state in which the pigment particles are dispersible in the aqueous medium even when a dispersant for dispersing the pigment is not used.

An ink composition containing a self-dispersible pigment as a colorant does not need to contain a dispersant, which is otherwise contained for dispersing a usual pigment. Therefore, the ink containing a self-dispersible pigment can be free from decrease in defoaming property due to a dispersant, and generation of foam is hardly observed in the ink composition containing a self-dispersible pigment. Accordingly, an ink composition with excellent ink ejection stability can be easily prepared by employing a self-dispersible pigment.

Examples of a dispersibility-imparting group to be bonded to the surfaces of the self-dispersible pigment particles include —COOH, —CO, —OH, —$SO_3H$, —$PO_3H_2$, and a quaternary ammonium, and salts thereof. A self-dispersible pigment can be manufactured by subjecting a pigment as a raw material to a physical or chemical treatment so as to bond (graft) a dispersibility-imparting group or an active species having a dispersibility-imparting group to the surfaces of the pigment particles. Examples of the physical treatment include a vacuum plasma treatment. Examples of the chemical treatment include a wet oxidizing method in which surfaces of pigment particles are oxidized by an oxidizing agent in water and a method in which p-aminobenzoic acid is bonded to surfaces of pigment particles whereby a carboxyl group is linked to the pigment particles through the phenyl group.

In the invention, preferable examples of the self-dispersible pigment include a self-dispersible pigment whose surface has been subjected to an oxidation treatment with a hypohalous acid and/or hypohalite and a self-dispersible pigment whose surface has been subjected to an oxidation treatment with ozone. Commercially available products may also be used as the self-dispersible pigment. Examples thereof include, MICROJET CW-1 (trade name, manufactured by Orient Chemical Industry), and CAB-O-JET200 and CAB-O-JET300 (trade names, manufactured by Cabot Corporation).

In the invention, the content of the pigment is preferably from 0.1 weight % to 15 weight %, more preferably from 0.5 weight % to 12 weight %, and particularly preferably from 1 weight % to 10 weight %, with respect to the total amount of the ink composition, in consideration of coloring properties, graininess, ink stability and ink ejection reliability.

Pigment Dispersant

A pigment dispersant (iii), which is hereinafter sometimes simply referred as "dispersant" and can be used in the encapsulated pigment or the resin dispersed pigment, may be selected from a nonionic compound, an anionic compound, a cationic compound, or an amphoteric compound.

Examples of the dispersant include a copolymer formed from monomers having an α, β-ethylenic unsaturated group. Examples of the monomers having an α, β-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as α-methyl styrene or vinyltoluene; vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and modified compounds of the above compounds.

A homopolymer formed by polymerization of one kind of monomer having an α, β-ethylenic unsaturated group, which may be selected from the above monomers, or a copolymer formed by copolymerization of plural kinds of monomer having an α, β-ethylenic unsaturated group, each of which may be selected from the above monomers, may be used as a polymer dispersant.

Examples of the dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

Among these, the following resin (A) is preferable as the dispersant. In preferable embodiments, the polymer which covers pigment particles in the encapsulated pigment contains the resin (A).

Resin (A)

The resin (A) can be used as a dispersant for dispersing the pigment in an aqueous liquid medium.

The structure of the resin (A) contains a hydrophobic structural unit (a) and a hydrophilic structural unit (b). If needed, the resin (A) may contain other structural unit, which is different from both of the hydrophobic structural unit (a) and the hydrophilic structural unit (b).

While the contents of the hydrophobic structural unit (a) and the hydrophilic structural unit (b) in the resin (A) vary with the degree of the hydrophilicity of the structural unit (b) or the hydrophobicity of the structural unit (a), the content of the hydrophobic structural unit (a) is preferably in excess of 80 weight %, and more preferably 85 weight % or more, with respect to the total amount of the resin (A). That is, the content of the hydrophilic structural unit (b) is preferably less than 20 weight %, and more preferably 15 weight % or less, with respect to the total amount of the resin (A). When the content of the hydrophilic structural unit (b) is 15 weight % or less, the amount of components independently dissolving in an aqueous liquid medium without contributing to the dispersion of the pigment may decrease, which may result in improving various properties such as dispersibility of the pigment, so that ejecting property of the ink composition can be improved.

Hydrophobic Structural Unit (a)

The resin (A) preferably contains at least a hydrophobic structural unit (a1), which is one of the hydrophobic structural unit (a) and has an aromatic ring which is linked to, through a linking group, an atom which configures a main chain structure of the resin (A).

Since the structural unit having the aromatic ring maintains an adequate distance between the aromatic ring, which is hydrophobic, and a hydrophilic structural unit in the resin (A), an interaction between the resin (A) and the pigment can easily occur, whereby the resin (A) can be firmly adsorbed to the pigment, so that the dispersibility of the pigment can be improved.

Hydrophobic Structural Unit (a1) Having Aromatic Ring

The content of the hydrophobic structural unit (a1) having an aromatic ring which is linked to, through a linking group, an atom which configures the main chain of the resin (A) is preferably from 40 weight % to less than 75 weight %, more preferably from 40 weight % to less than 70 weight %, and particularly preferably from 40 weight % to less than 60 weight %, with respect to the total amount of the resin (A), in consideration of dispersion stability of the pigment and ejection stability and washability of the ink composition.

The content of the aromatic ring which is linked to, through a linking group, an atom which configures the main chain of the resin (A) is preferably from 15 weight % to 27 weight %, more preferably from 15 weight % to 25 weight %, and particularly preferably from 15 weight % to 20 weight %, with respect to the total amount of the resin (A), from the viewpoint of improving rub resistance.

When the content of the aromatic ring in the unit (a1) are in the above ranges, rub resistance, ink stability and ink ejection reliability can be enhanced.

In the invention, the hydrophobic structural unit (a1) containing the aromatic ring in the hydrophobic structural unit (a) is preferably included in the resin (A) by taking a structure represented by the following Formula (1).

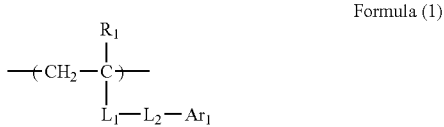

Formula (1)

In Formula (1), $R_1$ represents a hydrogen atom, a methyl group or a halogen atom; $L_1$ represents *—COO—, *—OCO—, *—CONR$_2$—, *—O—, or a substituted or unsubstituted phenylene group wherein the side designated by "*" in each structure corresponds to the side linked to the main chain of the resin (A); and $R_2$ represents a hydrogen atom or an alkyl group having 1 to 10 carbon atoms. $L_2$ represents a single bond or a divalent linking group having 1 to 30 carbon atoms. If $L_2$ represents a divalent linking group, the linking group preferably has 1 to 25 carbon atoms, and more preferably has 1 to 20 carbon atoms. Here, examples of the substituent include, but are not limited to, a halogen atom, an alkyl group, an alkoxy group, a hydroxyl group, and a cyano group. $Ar_1$ represents a monovalent group having an aromatic ring.

In preferable embodiments, in Formula (1), $R_1$ represents a hydrogen atom or a methyl group, $L_1$ represents *—COO—, and $L_2$ represents a divalent linking group having 1 to 25 carbon atoms and containing an alkyleneoxy group and/or an alkylene group. In more preferable embodiments, in Formula (1), $R_1$ represents a hydrogen atom or a methyl group, $L_1$ represents *—COO—, and $L_2$ represents —(CH$_2$—CH$_2$—O)— (where n represents an average of numbers of repeating units and is from 1 to 6).

The aromatic ring of $Ar_1$ contained in the hydrophobic structural unit (a1) is not particularly limited, and examples thereof include a benzene ring, a condensed aromatic ring having 8 or more carbon atoms, a heterocyclic ring condensed with an aromatic ring, and connected benzene rings in which two or more benzene rings are connected.

The condensed aromatic ring having 8 or more carbon atoms is an aromatic compound having 8 or more carbon atoms and containing: an aromatic ring formed by condensation of two or more benzene rings; and/or a ring formed by at least one aromatic ring and an alicyclic hydrocarbon condensed with the aromatic ring. Specific examples thereof include naphthalene, anthracene, fluorene, phenanthrene, and acenaphthene.

The heterocyclic ring condensed with an aromatic ring is a compound containing a condensed ring in which an aromatic compound (preferably a benzene ring) containing no hetero atom and a cyclic compound containing a hetero atom are condensed with each other. Here, the cyclic compound containing a hetero atom is preferably a 5-membered ring or a 6-membered ring. Preferable examples of the hetero atom include a nitrogen atom, an oxygen atom, and a sulfur atom. The cyclic compound containing a hetero atom may contain plural hetero atoms, and in this case, the hetero atoms may be the same or different from each other. Specific examples of the heterocyclic ring condensed with an aromatic ring include phthalimide, acridone, carbazole, benzoxazole, and benzothiazole.

Specific examples of a monomer that can form the hydrophobic structural unit (a1) containing a monovalent group having the benzene ring, the condensed aromatic ring having 8 or more carbon atoms, the heterocyclic ring condensed with an aromatic ring, or the two or more connected benzene rings are shown below, although the invention is not restricted to the following examples.

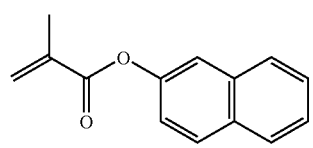

M-1

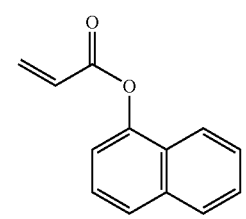

M-2

-continued
M-3
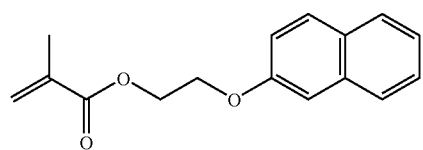
M-4
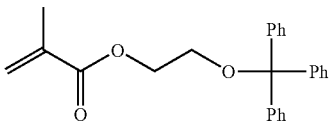
M-5
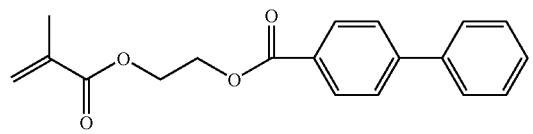
M-6
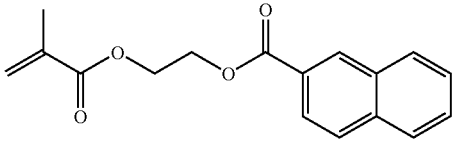
M-7
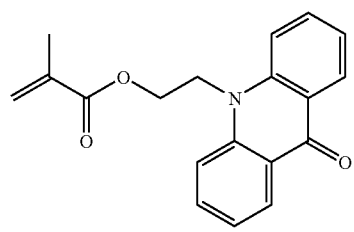
M-8
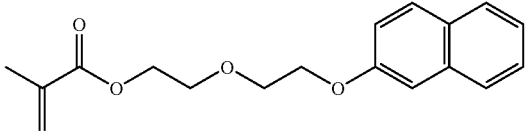
M-9
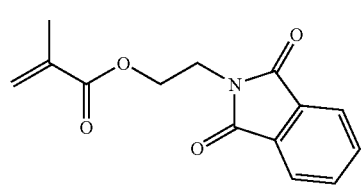
M-10
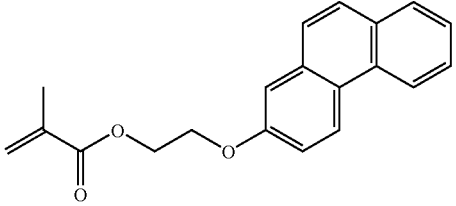
M-11
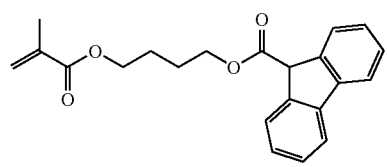
M-12
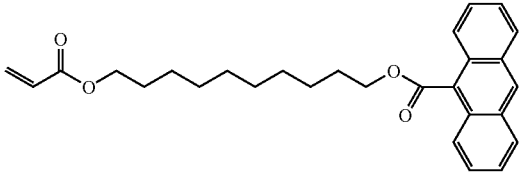
M-13
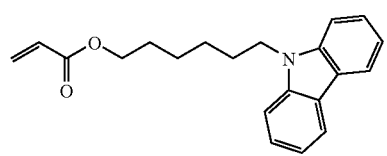
M-14
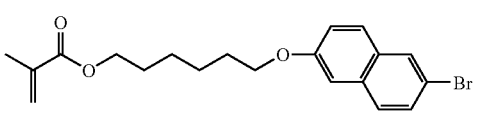
M-15
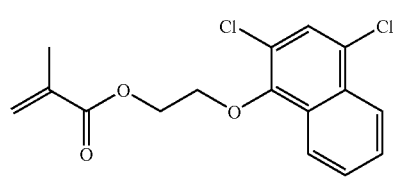
M-16
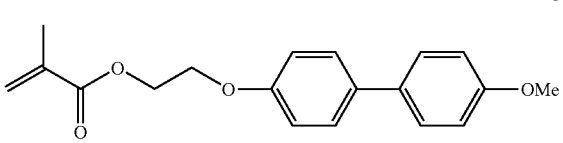
M-17
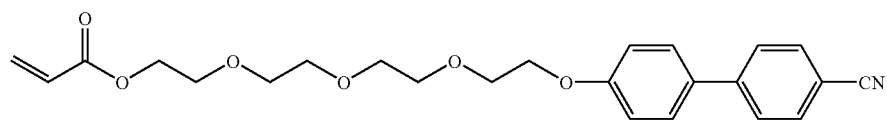
M-18
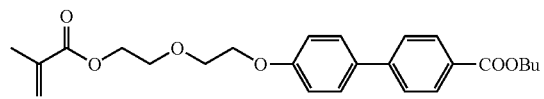
M-19
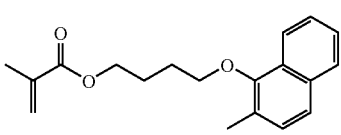

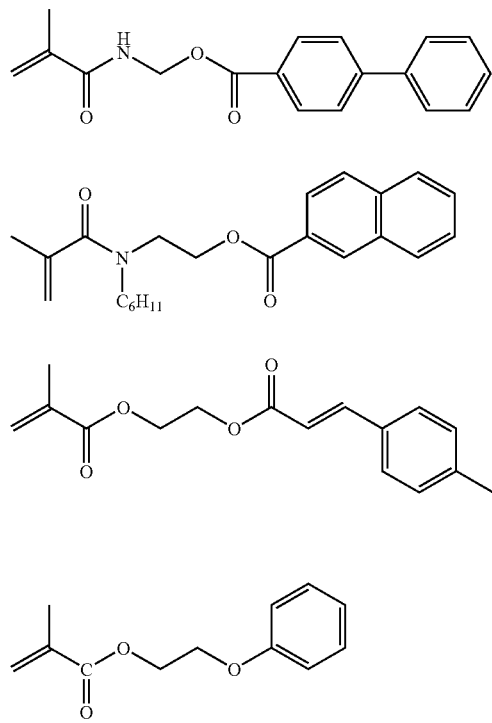

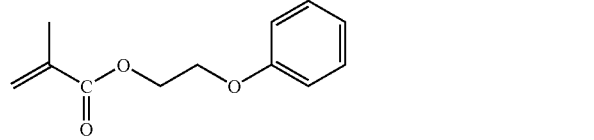

In the invention, the hydrophobic structural unit (a1) having an aromatic ring which is linked to, through a linking group, an atom which configures the main chain of the resin (A) is preferably a structural unit formed by modifying one or more of benzyl methacrylate, phenoxyethyl acrylate and phenoxyethyl methacrylate, in consideration of the dispersion stability.

Hydrophobic Structural Unit (a2) Derived from Acrylic or Methacrylic Ester of Alkyl Having 1 to 4 Carbon Atoms The resin (A) preferably contains a hydrophobic structural unit (a2) derived from an acrylic or methacrylic ester of an alkyl having 1 to 4 carbon atoms at an amount of at least 15 weight % or more with respect to the mass of the resin (A). The amount of the hydrophobic structural unit (a2) is more preferably form 20 weight % to 60 weight %, and still more preferably from 20 weight % to 50 weight % with respect to the mass of the resin (A). The hydrophobic structural unit (a2) can be typically incorporated into the resin (A) by employing an acrylic or methacrylic ester of an alkyl having 1 to 4 carbon atom as a monomer to be polymerized for forming the resin (A).

Specific examples of such a (meth)acrylic ester include methyl (meth)acrylate, ethyl(meth)acrylate, (iso)propyl (meth)acrylate, and (iso or tertiary) butyl(meth)acrylate.

The number of the carbon atoms of the alkyl group is preferably from 1 to 4, and more preferably from 1 to 2.

Examples of the other structural unit include a hydrophobic structural unit (c), which is other than the hydrophobic structural unit (a) and is outside the scope of the hydrophilic structural unit (b) described below (by being, for example, a structural unit having no hydrophilic functional group). Specific examples of the hydrophobic structural unit (c) include structural units derived from vinyl monomers, such as (meth) acrylamides, styrenes, or vinyl esters.

Examples of the (meth)acrylamides include N-cyclohexyl (meth)acrylamide, N-(2-methoxyethyl) (meth)acrylamide, N,N-diallyl (meth)acrylamide and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, and chloromethylstyrene; hydroxystyrene protected by a group (for example, t-Boc) that can be deprotected by an acidic material; methyl vinylbenzoate, α-methylstyrene, and vinyl naphthalene. Among them, styrene and α-methylstyrene are preferable Examples of the vinyl esters include vinyl acetate, vinyl chloroacetate, vinyl propionate, vinyl butyrate, vinyl methoxyacetate, and vinyl benzoate. Among them, vinyl acetate is preferable.

These monomers may be used singly, or in combination of two or more kinds thereof as a mixture.

The content of the other hydrophobic structural unit (c) is preferably 35 weight % or lower, more preferably 20 weight % or lower, and still more preferably 15 weight % or lower with respect to the total amount of the resin (A).

The other hydrophobic structural units (c) can be formed by polymerizing monomers corresponding thereto. The other hydrophobic structural units (c) can be also formed by introducing a hydrophobic functional group into a polymer chain after polymerization to form the resin (A).

Hydrophilic Structural Unit (B)

The content of the hydrophilic structural unit (b) in the resin (A) is more than 0 weight % and 15 weight % or less, preferably from 2 weight % to 15 weight %, more preferably from 5 weight % to 15 weight %, and even more preferably from 8 weight % to 12 weight %, with respect to the total amount of the resin (A).

The resin (A) preferably contains, as hydrophilic structural unit (b), a hydrophilic structural unit (b1) derived from acrylic acid and/or methacrylic acid.

Hydrophilic Structural Unit (b1)

The content of the hydrophilic structural unit (b1) can be adjusted based on the content of the structural unit (b2) described below or based on the content of the hydrophobic structural unit (a), or based on both of these.

The resin (A) employed in the invention contains the hydrophobic structural unit (a) at an amount of more than 80 weight % and the hydrophilic structural unit (b) at an amount of 15% or less. The configuration of the resin (A) can be determined based on the respective contents of the hydrophobic structural units (a1) and (a2), the hydrophilic structural units (b1) and (b2), and the other hydrophobic structural unit (c). For example, when the resin (A) consists only of the hydrophobic structural units (a 1) and (a2) and the hydrophilic structural units (b1) and (b2), the content (weight %) of the structural unit (b1) derived from acrylic acid and/or methacrylic acid can be obtained by the following equation.

Content of the structural unit ($b1$)=100−(weight % of the hydrophobic structural units ($a1$) and ($a2$))−(weight % of the structural unit ($b2$))

In this case, the sum of (b1) and (b2) is 15 weight % or less.

Further, when the resin (A) consists of the hydrophobic structural units (a1) and (a2), the hydrophilic structural unit (b1), and the other hydrophobic structural unit (c), the content (weight %) of the hydrophilic structural unit (b1) can be obtained by the following formula:

Content of the structural unit ($b1$)=100−(weight % of the hydrophobic structural units ($a1$) and ($a2$))−(weight % of the other hydrophobic structural unit ($c$))

The resin (A) may consist only of the hydrophobic structural unit (a1), the hydrophobic structural unit (a2), and the hydrophilic structural unit (b1).

The hydrophilic structural unit (b1) can be incorporated into the resin (A) by employing acrylic acid and/or methacrylic acid as a monomer to be polymerized for forming the resin (A).

Either acrylic acid or methacrylic acid may be used singly, or a mixture of acrylic acid and methacrylic acid may be used.

The acid value of the resin (A) of the invention is preferably from 30 mg KOH/g to 100 mg KOH/g, more preferably 30 mg KOH/g or more and less than 85 mg KOH/g, and particularly preferably 50 mg KOH/g or more and less than 85 mg KOH/g, in consideration of the pigment dispersibility and storage stability.

Here, the acid value is defined as the weight (mg) of KOH required for completely neutralizing 1 g of the resin (A), and can be measured in accordance with the method described in JIS Standard (JIS-K0070 (1992); the disclosure of which is incorporated by reference herein), which corresponds to ASTM D974.

Structural Unit (b2)

The structural unit (b2) preferably contains a nonionic hydrophilic group. The structural unit (b2) can be contained in the resin (A) by introducing monomers (monomer groups) containing a monomer corresponding to the structural unit (b2) during polymerization for forming the resin (A). The structural unit (b2) can be also obtained by incorporating a hydrophilic functional group into the polymer chain after formation of a polymer by polymerization to form the resin (A).

The monomer for forming the structural unit (b2) is not specifically limited as long as the monomer contains a functional group which can form a polymer and a nonionic hydrophilic functional group, and any known monomers can be used. In consideration of the availability, handling properties and versatility, vinyl monomers are preferable.

Examples of the vinyl monomers include (meth)acrylic acid esters, (meth)acrylamides, and vinyl esters, each of which having a hydrophilic functional group.

Examples of the hydrophilic functional group include a hydroxyl group, an amino group, an amide group (in which the nitrogen atom is non-substituted), alkyleneoxide polymers, which is described below, such as polyethylene oxide or polypropylene oxide.

Among these vinyl monomers, hydroxyethyl (meth)acrylate, hydroxybutyl (meth)acrylate, (meth)acrylamide, aminoethyl acrylate, aminopropyl acrylate, and (meth)acrylates containing an alkyleneoxide polymer, are particularly preferable.

In preferable embodiments, the structural unit (b2) contains a hydrophilic structural unit having an alkyleneoxide polymer structure.

The alkylene in the alkyleneoxide polymer preferably has 1 to 6 carbon atoms, more preferably has 2 to 6 carbon atoms, and even more preferably has 2 to 4 carbon atoms, in consideration of hydrophilicity. Herein, the polymerization degree of the alkyleneoxide polymer is preferably from 1 to 120, more preferably from 1 to 60, and particularly preferably from 1 to 30.

In other preferable embodiments, the structural unit (b2) is a hydrophilic structural unit containing a hydroxyl group.

Herein, the number of the hydroxyl groups in the structural unit (b2) is not specifically limited, although it is preferably from 1 to 4, more preferably from 1 to 3, and particularly preferably from 1 to 2, in consideration of the hydrophilicity of the resin (A) and the compatibility with a solvent or other monomers at the time of polymerization.

The resin (A) employed in the invention may be a random copolymer in which the respective structural units are randomly introduced or a block copolymer in which the respective structural units are regularly introduced. When the resin (A) is a block copolymer, the order of introducing the respective structural units during the synthesis of the block polymer is not limited; further, the same structural unit may be used two or more times during the synthesis of the block copolymer. The resin (A) is preferably a random copolymer in consideration of the versatility and manufacturability.

The molecular weight of the resin (A) used in the invention is, in terms of a weight average molecular weight (Mw), preferably from 30,000 to 150,000, more preferably from 30,000 to 100,000, and still more preferably from 30,000 to 80,000.

When the resin (A) has a molecular weight within the above ranges, steric repulsion effect that the resin (A) can exerts as a dispersant may improve and the time it takes for the resin (A) to adsorb to the pigment may be shortened due to steric effect, which is preferable.

The molecular weight distribution (weight average molecular weight/number average molecular weight) of the resin (A) used in the invention is preferably from 1 to 6, and more preferably from 1 to 4.

It is preferable that the molecular weight distribution is set within the above ranges, in consideration of the dispersion stability and ejection stability of the ink composition. Each of the number average molecular weight and the weight average molecular weight used herein is a molecular weight value obtained by measuring a molecular weight with a GPC analyzer using columns of TSKgel GMHxL, TSKgel G4000HxL and TSKgel G2000HxL (trade names, manufactured by Tosoh Corporation) and then converting the measured value using polystyrene as a reference material; the solvent used for GPC is THF and the detection is conducted by a differential refractometer.

The resin (A) used in the invention can be synthesized using various polymerization methods, such as a solution polymerization, a precipitation polymerization, a suspension polymerization, a bulk polymerization, or an emulsion polymerization. The polymerization reaction can be performed by known operations such as a batch system, a semi-continuous system or a continuous system.

The polymerization initiation method may be a method of using a radical initiator or a method of irradiating light or radiation, for example. These polymerization methods and the polymerization initiation methods are described, for example, in Teiji Tsuruta, Kobunshi Gousei Houhou (Polymer Synthesis Method), revised edition (Nikkan Kogyo Shimbun (1971)) and Takayuki Otsu and Masayoshi Kinoshita, Koubunshi Gousei-no Jikken-ho (Experimental Method of Polymer Synthesis), (Kagaku-Dojin (1972)), pp. 124-154; the disclosures of which are incorporated by reference herein.

Among these polymerization methods, the solution polymerization method using a radical initiator is particularly preferable. Examples of the solvent used in the solution polymerization method include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used singly, or may be used in the form of a mixture of two or more kinds thereof, or may be mixed with water and used as a mixed solvent.

The polymerization temperature should be set in consideration of, for example, the molecular weight of the polymer to be formed and the kind of the initiator. In general, the polymerization temperature is from about 0° C. to about 100° C. It is preferable to perform polymerization at a temperature of from 50° C. to 100° C.

The reaction pressure can be suitably selected, and is usually from about 1 kg/cm$^2$ to about 100 kg/cm$^2$, and is preferably from about 1 kg/cm$^2$ to about 30 kg/cm$^2$. The reaction time may be from about 5 hours to about 30 hours. The obtained resin may be purified by reprecipitation or the like.

Preferable examples of the resin (A) of the invention are shown below, while the invention is not limited thereto. Herein, a, b, c, d, e, f, g, h, and i each represent a ratio of the respective unit in terms of weight % with respect to the total amount of the exemplified resin (A).

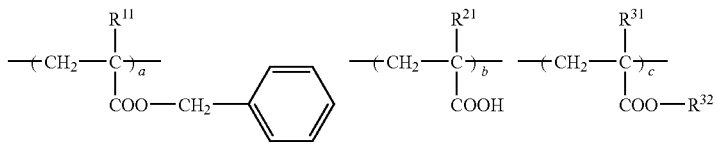

| | $R^{11}$ | $R^{21}$ | $R^{31}$ | $R^{32}$ | a | b | c | Mw |
|---|---|---|---|---|---|---|---|---|
| B-1 | CH$_3$ | CH$_3$ | CH$_3$ | —CH$_3$ | 60 | 10 | 30 | 46000 |
| B-2 | H | H | H | —CH$_3$ | 60 | 10 | 30 | 50000 |
| B-3 | CH$_3$ | CH$_3$ | CH$_3$ | —CH$_2$CH$_3$ | 61 | 10 | 29 | 43000 |
| B-4 | CH$_3$ | CH$_3$ | CH$_3$ | —CH$_2$CH$_2$CH$_2$CH$_3$ | 61 | 9 | 30 | 51000 |
| B-5 | CH$_3$ | CH$_3$ | CH$_3$ | —CH$_2$(CH$_3$)CH$_3$ | 60 | 9 | 31 | 96000 |
| B-6 | H | H | H | —CH$_2$(CH$_3$)(CH$_3$)CH$_3$ | 60 | 10 | 30 | 32000 |
| B-7 | CH$_3$ | CH$_3$ | CH$_3$ | —CH$_2$CH(CH$_3$)CH$_3$ | 60 | 5 | 30 | 75000 |

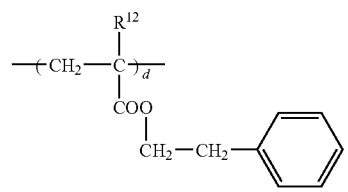

| | $R^{12}$ | $R^{22}$ | $R^{33}$ | $R^{34}$ | d | e | f | Mw |
|---|---|---|---|---|---|---|---|---|
| B-8 | CH$_3$ | CH$_3$ | CH$_3$ | —CH$_3$ | 55 | 12 | 33 | 31000 |
| B-9 | H | H | H | —CH$_2$CH(CH$_3$)CH$_3$ | 70 | 10 | 20 | 34600 |

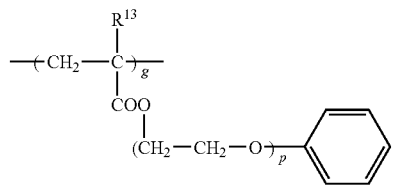
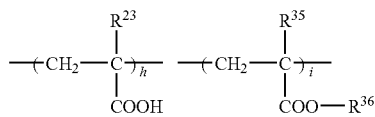
| | $R^{13}$ | p | $R^{23}$ | $R^{35}$ | $R^{36}$ | g | h | i | Mw |
|---|---|---|---|---|---|---|---|---|---|
| B-10 | $CH_3$ | 1 | $CH_3$ | $CH_3$ | $-CH_3$ | 60 | 9 | 31 | 35500 |
| B-11 | H | 1 | H | H | $-CH_2CH_3$ | 69 | 10 | 21 | 41200 |
| B-12 | $CH_3$ | 2 | $CH_3$ | $CH_3$ | $-CH_3$ | 70 | 11 | 19 | 68000 |
| B-13 | $CH_3$ | 4 | $CH_3$ | $CH_3$ | $-CH_2(CH_3)CH_3$ | 70 | 7 | 23 | 72000 |
| B-14 | H | 5 | H | H | $-CH_3$ | 70 | 10 | 20 | 86000 |
| B-15 | H | 5 | H | H | $-CH_2CH(CH_3)CH_3$ | 70 | 2 | 28 | 42000 |
B-16 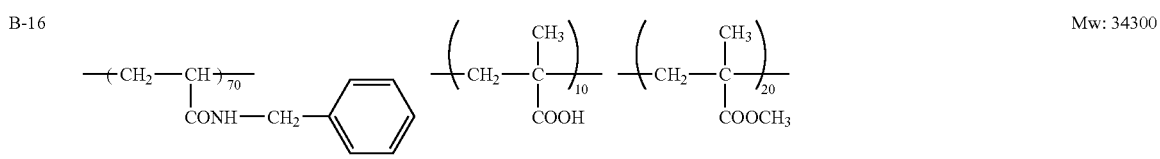 Mw: 34300
B-17 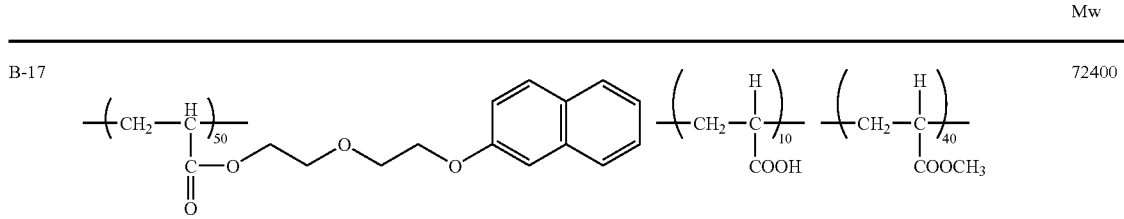 Mw 72400
B-18 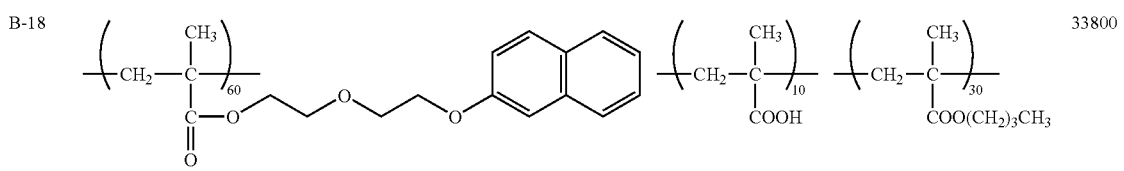 33800
B-19 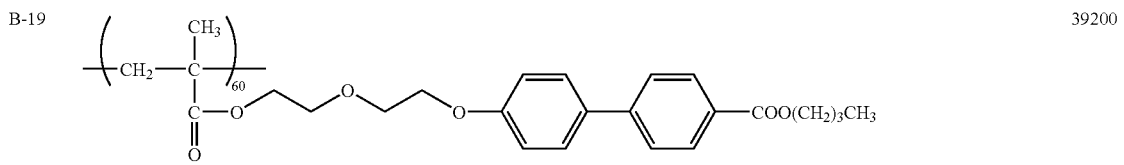 39200
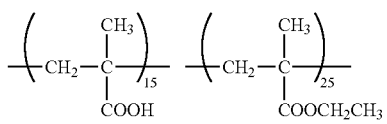

B-20 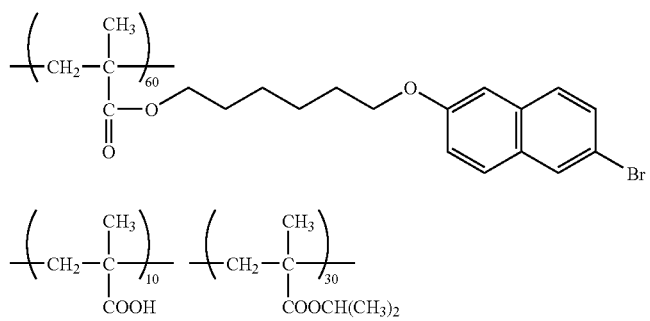
55300

Content Ratio of Resin Dispersant (Resin (A)) to Pigment

The ratio (mass ratio) of a content a resin dispersant (resin (A)) to a content a pigment (resin dispersant/pigment) in the ink composition is preferably from 25/100 to 140/100, and more preferably from 25/100 to 50/100. When the ratio is 25/100 or more, the dispersion stability and rub resistance may tend to be improved. When the content ratio is 140/100 or less, the dispersion stability may tend to be improved as well.

The weight average molecular weight of the resin dispersant (resin (A)) employed in the invention is preferably in from 2,000 to 60,000.

(iv) Polymer Particle

The ink composition employed in the invention contains at least one kind of polymer particles. This configuration can effectively improve rub resistance of an image formed by the ink composition.

Examples of the polymer particles employed in the invention include particles of a resin having an anionic group such as: a thermoplastic, thermosetting, or modified acrylic resin, an epoxy resin, a polyurethane resin, a polyether resin, a polyamide resin, an unsaturated polyester resin, a phenol resin, a silicone resin, or a fluoro resin; a polyvinyl resin such as vinyl chloride, vinyl acetate, polyvinyl alcohol, or polyvinyl butyral, a polyester resin such as an alkyd resin or a phthalic resin; an amino resin material such as a melamine resin, a melamine formaldehyde resin, an amino alkyd co-condensation resin, a urea resin, or a urea resin; or mixtures or copolymers thereof.

Among the above, the anionic acrylic resin can be obtained by polymerizing, in a solvent, acrylic monomers having an anionic group (anionic group-containing acrylic monomer) and, as required, another monomer that can be copolymerized with the anionic group-containing acrylic monomer. Examples of the anionic group-containing acrylic monomer include an acrylic monomer having at least one selected from the group consisting of a carboxyl group, a sulfonic acid group, and a phosphonic acid group. Among the above, the acrylic monomers having a carboxyl group (e.g., acrylic acid, methacrylic acid, crotonic acid, ethacrylic acid, propylacrylic acid, isopropylacrylic acid, itaconic acid, and fumaric acid) are preferable, and acrylic acid or methacrylic acid is particularly preferable.

In preferable embodiments, the polymer particles employed in the invention can be preferably self-dispersible polymer particles, and in more preferable embodiments, the polymer particles employed in the invention can be self-dispersible polymer particles having a carboxyl group, from the viewpoint of jetting stability and stability of ink composition as liquid (particularly dispersion stability) when the pigment described above is used. The "self-dispersible polymer particles" refer to particles of a water-insoluble polymer that can be in a dispersion state in an aqueous medium in the absence of another surfactant by a functional group (particularly an acidic group or a salt thereof) contained in the polymer and that does not contain a free emulsifier.

The "dispersion state" can be either an emulsion state, in which the water-insoluble polymer is dispersed as a liquid in an aqueous medium, or a suspension state, in which the water-insoluble polymer is dispersed as a solid in an aqueous medium.

From the viewpoint of the aggregation rate and the fixing property when the water-insoluble polymer is employed to form the ink composition, the water-insoluble polymer used in the invention is preferably one that can be in the suspension state.

The self-dispersible polymer particles employed in the invention can be visually observed as being in the dispersion state at 25° C. for at least one week, even when the dispersion thereof is prepared by mixing and stirring, by using a stirrer having a stirring blade with number of rotations of 200 rpm for 30 minutes at 25° C., a mixture of a solution containing 30 g of the water-insoluble polymer dissolved in 70 g of organic solvent such as methyl ethyl ketone, a neutralizer which can neutralize all salt-forming groups of the water-insoluble polymer, and 200 g of water, and then removing the organic solvent from the mixture solution, although the neutralizer is either sodium hydroxide when the salt-forming group is anionic or is acetic acid when a salt-forming group is cationic.

The "water-insoluble polymer" refers to a polymer whose dissolved amount to 100 g of water at 25° C. is 10 g or lower when the polymer is dried at 105° C. for 2 hours and then dissolved in the water. The dissolved amount is preferably 5 g or lower, and more preferably 1 g or lower. The "dissolved amount" is an amount of (a part of) the water-insoluble polymer dissolved in a solvent (water) when the water-insoluble polymer is completely neutralized with sodium hydroxide or acetic acid, wherein the selection from the sodium hydroxide and the acetic acid accords to the type of the salt-forming group of the water-insoluble polymer.

The aqueous medium contains water and may further contain a hydrophilic organic solvent as required. In preferable embodiments, the aqueous medium contains water and a hydrophilic organic solvent, an amount of the hydrophilic organic solvent being in a range of 0.2 weight % or lower with respect to water, and in more preferable embodiments, the aqueous medium is substantially water.

There is no limitation on the main chain skeleton of the water-insoluble polymer. Examples include vinyl polymer and a condensed polymer (e.g., an epoxy resin, polyester, polyurethane, polyamide, cellulose, polyether, polyurea, polyimide, and polycarbonate). Among the above, vinyl polymer is particularly preferable.

Preferable examples of vinyl polymer and a monomer which configures vinyl polymer include substances disclosed in JP-A Nos. 2001-181549 and 2002-88294. Moreover, a vinyl monomer in which a dissociative group has been introduced into a terminal of a polymer by radical polymerization of a vinyl polymer using a chain transfer agent or a polymerization initiator having a dissociative group (or a substituent that can be induced to be a dissociative group) or an iniferter or by ion polymerization using a compound having a dissociative group (or a substituent that can be induced to be a dissociative group) in either an initiator or a stopper also can be used.

Preferable examples of a condensed polymer and a monomer which configures the condensed polymer include substances described in JP-A No. 2001-247787.

In preferable embodiments, the self-dispersible polymer particles employed in the invention contains a water-insoluble polymer containing a hydrophilic structural unit and a structural unit derived from an aromatic group-containing monomer from the viewpoint of self-dispersibility.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The hydrophilic group is preferably a dissociative group, and more preferably an anionic dissociative group, from the viewpoint of promoting the self-dispersibility and improving stability of the emulsion state or dispersion state of the self-dispersible polymer particles. Examples of the dissociative group include a carboxyl group, a phosphonic acid group, and a sulfonic acid group. Among the above, the carboxyl group is preferable from the viewpoint of fixing property when the ink composition is formed therewith.

The hydrophilic group-containing monomer is preferably a dissociative group-containing monomer from the viewpoint of self-dispersibility and aggregation properties, and specifically, the hydrophilic group-containing monomer is preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoint of dispersion stability and jetting stability, the unsaturated carboxylic acid monomer is preferable and acrylic acid and methacrylic acid are more preferable.

In embodiments, the self-dispersible polymer particles employed in the invention preferably contain a polymer having a carboxyl group from the viewpoint of improving self-dispersibility and an aggregation rate when the ink composition contacts a coagulation liquid. In more preferable embodiments, the self-dispersible polymer particles employed in the invention contain a polymer having a carboxyl group and an acid value (mgKOH/g) of 25 to 100. In further preferable embodiments, the acid value is from 25 to 80, and in particularly preferable embodiments, the acid value is from 30 to 65, from the viewpoint of improving self-dispersibility and an aggregation rate when the ink composition contacts a coagulation liquid.

Stability of the dispersion state of the self-dispersible polymer particles can be favorable when the acid value is 25 or more, and the aggregation properties can be improved when the acid value is 100 or lower.

There is no particular limitation on the aromatic group-containing monomer insofar as it is a compound containing an aromatic group and a polymerizable group. The aromatic group may be a group derived from an aromatic hydrocarbon or a group derived from an aromatic heterocyclic ring. In embodiments, the aromatic group is preferably an aromatic group derived from an aromatic hydrocarbon from the viewpoint of particle shape stability in an aqueous medium.

The polymerizable group may be a condensation polymerizable group or an addition polymerizable group. In embodiments, from the viewpoint of particle shape stability of the self-dispersible polymer particles in the aqueous medium, the polymerizable group preferably an addition polymerizable group, and more preferably a group containing an ethylenically unsaturated bond.

The aromatic group-containing monomer employed in the invention is preferably a monomer having an ethylenically unsaturated bond and an aromatic group derived from aromatic hydrocarbon. The aromatic group-containing monomers may be used singly or in combination of two or more.

Examples of the aromatic group-containing monomer include phenoxyethyl(meth)acrylate, benzyl(meth)acrylate, phenyl(meth)acrylate, and a styrene monomer. Examples which are preferable from the viewpoint of well-balancing hydrophilicity and hydrophobicity of the polymer chain of the self-dispersible polymer particles and ink fixing property include an aromatic group-containing (meth)acrylate monomer. Specifically, phenoxyethyl(meth)acrylate, benzyl(meth)acrylate, and phenyl(meth)acrylate are more preferable, and phenoxyethyl(meth)acrylate and benzyl(meth)acrylate are further preferable.

The "(meth)acrylate" refers to acrylate or methacrylate.

In preferable embodiments, the self-dispersible polymer particles employed in the invention contains a structural unit derived from the aromatic group-containing (meth)acrylate monomer, the content of which being from 10 weight % to 95 weight % with respect to the total amount of the water-insoluble polymer which forms the self-dispersible polymer particles. When the content of the aromatic group-containing (meth)acrylate monomer is from 10 weight % to 95 weight %, self-emulsifying property or stability of the dispersion state improves to thereby suppress an increase in ink viscosity.

In embodiments, the content of the aromatic group-containing (meth)acrylate monomer is more preferably from 15 weight % to 90 weight %, more preferably from 15 weight % to 80 weight %, and particularly preferably from 25 weight % to 70 weight %, from the viewpoint of improvement in self-emulsifying property or stability of the dispersion state, stabilization of the particle shape in an aqueous medium due to hydrophobic interaction of aromatic rings, and reduction in the amount of water-soluble components via appropriate hydrophobilyzation of particles.

The self-dispersible polymer particles employed in the invention can be formed by using, for example, a structural unit derived from the aromatic group-containing monomer and a structural unit derived from the dissociative group-containing monomer. The self-dispersible polymer particles may further contain other structural units.

While there is no limitation on a monomer which forms the other structural unit insofar as it can be copolymerized with the aromatic group-containing monomer and the dissociative group-containing monomer, from the viewpoint of flexibility of the main chain skeleton of the water-insoluble polymer or ease of regulation of glass transition temperature (Tg), an alkyl group-containing monomer is preferable.

Examples of the alkyl group-containing monomer include alkyl(meth)acrylates, such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, or ethylhexyl (meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylamino alkyl (meth)acrylates, such as dimethylaminoethyl(meth)acrylate; N-hydroxyalkyl(meth)acrylamides, such as N-hydroxymethyl(meth)acrylamide, N-hydroxyethyl(meth)acrylamide, or N-hydroxybutyl(meth)acrylamide; and (meth)acrylamides, such as N-alkoxyalkyl(meth)acrylamides, such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide, or N-(n-, iso)butoxyethyl(meth) acrylamide.

The molecular weight range of the water-insoluble polymer which configures the self-dispersible polymer particles employed in the invention is, in terms of weight average molecular weight, preferably from 3,000 to 200,000, more preferably from 5,000 to 150,000, and still more preferably from 10,000 to 100,000. By adjusting the weight average molecular weight to 3,000 or more, the content of water-soluble components can be effectively reduced. By adjusting the weight average molecular weight to 200,000 or lower, stability of self-dispersibility can be increased. The weight average molecular weight can be measured by gel permeation chromatography (GPC). HLC-8020GPC (trade name, manufactured by Tosoh Corporation) is used as GPC apparatus, three columns of TSKGEL, SUPER MULTIPORE HZ-H (trade name, manufactured by Tosoh Corporation, 4.6 mmID×15 cm), and THF (tetrahydrofuran) as an eluate. The measurement is performed using an IR detector under the conditions of a sample concentration of 0.35 weight %, a flow rate of 0.35 ml/min., an injection amount of a sample of 10 µl, and a measurement temperature of 40° C. Calibration curves are prepared by eight samples of REFERENCE SAMPLE TSK STANDARD, POLYSTYRENE (trade name, manufactured by Tosoh Corporation): "F-40", "F-20", "F-4", "F-1", "A-5000", "A-2500", "A-1000" and "n-propylbenzene".

From the viewpoint of regulation of hydrophilicity and hydrophobicity of a polymer, in preferable embodiments, the water-insoluble polymer which configures the self-dispersible polymer particles employed in the invention contains a structural unit derived from the aromatic group-containing (meth)acrylate monomer (preferably a structural unit derived from phenoxyethyl(meth)acrylate and/or a structural unit derived from benzyl(meth)acrylate), wherein the content (co-polymerization ratio) of the aromatic group-containing (meth)acrylate monomer is from 15 weight % to 80 weight % with respect to the total amount of self-dispersible polymer particles.

From the viewpoint of regulation of hydrophilicity and hydrophobicity of a polymer, in preferable embodiments, the water-insoluble polymer preferably contains a structural unit derived from the aromatic group-containing (meth)acrylate monomer, a structural unit derived from a carboxyl group-containing monomer, and a structural unit derived from an alkyl group-containing monomer (preferably a structural unit derived from alkyl ester of (meth)acrylic acid wherein the content (copolymerization ratio) of the aromatic group-containing (meth)acrylate monomer is from 15 weight % to 80 weight % with respect to the total amount of self-dispersible polymer particles. In more preferable embodiments, the water-insoluble polymer contains a structural unit derived from phenoxyethyl(meth)acrylate and/or a structural unit derived from benzyl(meth)acrylate, a structural unit derived from a carboxyl group-containing monomer, and a structural unit derived from an alkyl group-containing monomer (preferably a structural unit derived from alkyl ester having 1 to 4 carbon atoms of (meth)acrylic acid), wherein the content (copolymerization ratio) of the phenoxyethyl(meth)acrylate and/or a structural unit derived from benzyl(meth)acrylate is from 15 weight % to 80 weight % with respect to the total amount of self-dispersible polymer particles. In addition, the water-insoluble polymer preferably has the acid value of from 25 to 100 and the weight average molecular weight of 3,000 to 200,000, and more preferably has the acid value of from 25 to 95 and the weight average molecular weight of 5,000 to 150,000.

Hereinafter, exemplary compounds B-01 to B-19 are shown as specific examples of the water-insoluble polymer which configures the self-dispersible polymer particles, although the invention is not limited thereto. The ratio in the brackets represents the mass ratio of copolymerization components.

B-01: Phenoxyethyl acrylate/Methyl methacrylate/Acrylate copolymer (50/45/5)

B-02: Phenoxyethyl acrylate/Benzyl methacrylate/Isobutyl methacrylate/Methacrylate copolymer (30/35/29/6)

B-03: Phenoxyethyl methacrylate/Isobutyl methacrylate/ Methacrylate copolymer (50/44/6)

B-04: Phenoxyethyl acrylate/Methyl methacrylate/Ethylacrylate/Acrylate Copolymer (30/55/10/5)

B-05: Benzyl methacrylate/Isobutyl methacrylate/Methacrylate copolymer (35/59/6)

B-06: Styrene/Phenoxyethyl acrylate/Methyl methacrylate/ Acrylate copolymer (10/50/35/5)

B-07: Benzyl acrylate/Methyl methacrylate/Acrylate copolymer (55/40/5)

B-08: Phenoxyethyl methacrylate/Benzyl acrylate/Methacrylate copolymer (45/47/8)

B-09: Styrene/Phenoxyethyl acrylate/Butyl methacrylate/ Acrylate copolymer (May 48, 1940/7)

B-10: Benzyl methacrylate/Isobutyl methacrylate/Cyclohexyl methacrylate/Methacrylate copolymer (35/30/30/5)

B-11: Phenoxyethyl acrylate/Methyl methacrylate/Butyl acrylate/Methacrylate copolymer (12/50/30/8)

B-12: Benzyl acrylate/Isobutyl methacrylate/Acrylate copolymer (93/2/5)

B-13: Styrene/Phenoxyethyl methacrylate/Butyl acrylate/ Acrylate copolymer (50/5/20/25)

B-14: Styrene/Butyl acrylate/Acrylate copolymer (62/35/3)

B-15: Methyl methacrylate/Phenoxyethyl acrylate/Acrylate copolymer (45/51/4)

B-16: Methyl methacrylate/Phenoxyethyl acrylate/Acrylate copolymer (45/49/6)

B-17: Methylmethacrylate/Phenoxyethyl acrylate/Acrylate copolymer (45/48/7)

B-18: Methyl methacrylate/Phenoxyethyl acrylate/Acrylate copolymer (45/47/8)

B-19: Methylmethacrylate/Phenoxyethyl acrylate/Acrylate Copolymer (45/45/10)

There is no particular limitation on a method of producing the water-insoluble polymer which configures the self-dispersible polymer particles employed in the invention. Examples include: a method including performing emulsion polymerization in the presence of a polymerizable surfactant to covalently bind a surfactant and a water-insoluble polymer; and a method including copolymerizing a monomer mixture containing the hydrophilic group-containing monomer and the aromatic group-containing monomer by known polymerization methods such as a solution-polymerization method or a block-polymerization method. Among the polymerization methods, the solution-polymerization method is preferable, and the solution-polymerization method using an organic solvent is more preferable, from the viewpoint of an aggregation rate and droplet jetting stability when the self-dispersible polymer particles are employed in the ink composition.

From the viewpoint of an aggregation rate, it is preferable that the self-dispersible polymer particles employed in the invention contain a polymer, the polymer being synthesized in an organic solvent and having a carboxyl group (, preferably the acid value thereof being 20 to 100,), and the self-dispersible polymer particles being prepared as a polymer dispersion in which the carboxyl group of the polymer is partially or thoroughly neutralized and water serves as a continuous phase. More specifically, the production of the self-dispersible polymer particles employed in the invention preferably has synthesizing a polymer in an organic solvent and dispersing the polymer to form an aqueous dispersion in which at least a part of the carboxyl group of the polymer is neutralized.

The dispersing preferably includes the following processes (1) and (2).

Process (1): Stirring a mixture containing a polymer (water-insoluble polymer), an organic solvent, a neutralizer, and an aqueous medium; and Process (2): Removing the organic solvent from the mixture.

The process (1) preferably includes obtaining a dispersion by dissolving the polymer (water-insoluble polymer) in an organic solvent first, gradually adding a neutralizer and an aqueous medium, and mixing and stirring the mixture. The addition of the neutralizer and the aqueous medium in a solution of the water-insoluble polymer in which the polymer has been dissolved into an organic solvent may enable to provide self-dispersible polymer particles having particle diameters which may enable to achieve higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the solvents, the ketone solvent, such as methyl ethyl ketone, and the alcohol solvent, such as isopropyl alcohol, are preferable. It is also preferable to use isopropyl alcohol and methyl ethyl ketone in combination in view of making the change in polarity at the time of phase inversion from an oil phase to a water phase being moderate. By using the solvents in combination, self-dispersible polymer particles that can be free from coagulation-precipitation or fusion of particles and can have high dispersion stability and fine particle diameters can be obtained.

The neutralizer is used for forming an emulsion state or a dispersion state in which the dissociative group is partially or thoroughly neutralized and the self-dispersible polymer is stabilized in water. Examples of the neutralizer which can be used when the self-dispersible polymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the self-dispersible polymer particles employed in the invention in water, sodium hydroxide, potassium hydroxide, triethylamine, and triethanolamine are preferable.

The content of the basic compound is preferably from 5 to 120 mol %, more preferably from 10 to 110 mol %, and still more preferably from 15 to 100 mol %, with respect to 100 mol % of the dissociative groups. Stabilization of the dispersion of the particles in water can be further demonstrated when the content of the basic compound is adjusted to 15 mol % or more. Reduction in content of the water-soluble components can be obtained when the content of the basic compound is adjusted to 100 mol % or lower.

In the process (2), an aqueous dispersion of the self-dispersible polymer particles can be obtained by inverting a phase of the dispersion, which has been obtained in the process (1), to a water phase by common procedures such as vacuum distillation distilling off the organic solvent from. The thus-obtained aqueous dispersion is substantially free of the organic solvent. The amount of the organic solvent contained in the aqueous dispersion is preferably 0.2 weight % or lower, and more preferably 0.1 weight % or lower.

The average particle diameter of the polymer particles (particularly the self-dispersible polymer particles) is, in terms of a volume average particle diameter, preferably in the range of 10 nm to 400 nm, more preferably in the range of 10 nm to 200 nm, still more preferably in the range of 10 nm to 100 nm, and particularly preferably in the range of 10 nm to 50 nm. When the average particle diameter is 10 nm or more, suitability of the polymer particles to production process may be increased. When the average particle diameter is 400 nm or lower, the storage stability may be increased. The particle size distribution of the polymer particles is not particularly limited. The polymer particles may have either a broad particle size distribution or a monodisperse particle size distribution. Two or more water-insoluble particles may be used in combination as a mixture.

The average particle diameter and particle size distribution of the polymer particles can be determined by measuring the volume average particle diameter by dynamic light scattering using a nanotruck particle size distribution meter UPA-EX150 (trade name, manufactured by Nikkiso Co., Ltd.).

From the viewpoint of glossiness of an image formed from the ink composition or the like, the content of the polymer particles (particularly the self-dispersible polymer particles) in the ink composition is preferably from 1 weight % to 30 weight %, and more preferably 2 weight % to 15 weight %, with respect to the total amount of the ink composition.

Ratio of Pigment (i) with Respect to Pigment Dispersant (iii) and Polymer Particle (iv)

In the invention, a solid content ratio of the pigment (i) relative to the pigment dispersant (iii) and the polymer particles (iv) [namely, {a solid content of the pigment (i)}/{a sum of the solid content of the dispersant (iii) and the solid content of the polymer particles (iv)}] is preferably 1 or less, more preferably from 0.1 to 1, and even more preferably from 0.2 to 0.9 in terms of weight in view of improving dispersion stability and scratch-resistance.

The polymer particles (particularly the self-dispersible polymer particles) can be used singly or in a form of a mixture of two or more thereof.

Water

The ink composition employed in the invention preferably contains water.

While the amount of water contained in the ink composition is not particularly limited, the addition amount of water is preferably from 10 weight % to 99 weight %, more preferably from 30 weight % to 80 weight %, and still more preferably from 50 weight % to 70 weight %, with respect to the total amount of the ink composition from the viewpoint of maintaining the stability and ejection reliability of the ink composition.

Solvent

The ink composition used in the invention preferably contains a solvent.

Examples of the solvent include solvents exemplified above for the maintenance liquid. In particular, to suppress curl and obtain solubility of a solid residue derived from an ink composition, a solvent preferably includes one or more solvents which have an SP value of 27.5 or less, more preferably an SP value of 26 or less, and particularly preferably an SP value of 24 or less, at a content of 70 weight % or more with respect to the total solvent content of the ink composition.

Examples of the solvent having an SP value of 27.5 or less used in the invention include those employable as the solvent described above for the maintenance liquid, and preferable examples are similar to those described above for the maintenance liquid.

One solvent may be used, or two or more solvents may be used in a mixture as the solvent contained in the ink composition.

The content of solvent in the ink composition is not particularly limited. In view of ensuring stability and reliability of jetting, the content of from 1 to 60 weight % is preferable, the content of from 5 to 40 weight % is more preferable, and the content of from 5 to 30 weight % is particularly preferable.

The solvent having an SP value of 27.5 or less is preferably contained at a content of 70 weight %, more preferably at a content of 80 weight %, and particularly preferably at a content of 90 weight %, with respect to the total solvent content of the ink composition.

The ink composition of the invention may further contain other additives as required. Examples of such other additives include known additives such as a surfactant, an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

Surfactant

The ink composition employed in the invention may contain a surfactant as a surface tension adjusting agent.

Examples of the surface tension adjusting agent include a nonionic surfactant, a cationic surfactant, an anionic surfactant, and a betaine surfactant. An amount of the surface tension adjusting agent is preferably adjusted so as to set the surface tension of the ink composition to be from 20 mN/m to 60 mN/m, more preferably from 20 mN/m to 45 mN/m, and still more preferably from 25 mN/m to 40 mN/m, in consideration of ink ejecting stability when the ink composition is used in an inkjet recording method.

A compound having a structure in which a hydrophilic moiety and a hydrophobic moiety are included in a molecule thereof can be effectively used as the surfactant. Any of an anionic surfactant, a cationic surfactant, an amphoteric surfactant, and a nonionic surfactant can be used. The polymer substance (polymer dispersant) can be also used as the surfactant.

Examples of the anionic surfactant include sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctylsulfosuccinate, a sodium polyoxyethylene alkylether sulfate, a sodium polyoxyethylene alkylphenylether sulfate, sodium dialkylsulfosuccinate, sodium stearate, sodium oleate, and sodium t-octylphenoxyethoxy-polyethoxyethyl sulfate. The anionic surfactant may be used singly, or in combination of two or more thereof.

Examples of the nonionic surfactant include acetylenediol compounds such as an acetylenediol ethyleneoxide adducts, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

In view of preventing interference among applied ink droplets, nonionic surfactants are preferable, and in particular, acetylenediol compounds are preferable.

The addition amount of the surfactants to be added to the ink composition employed in the invention is not specifically limited, although it is preferably from 0.1 weight % or more, more preferably from 0.5 weight % to 10 weight %, and still more preferably from 1 weight % to 3 weight %.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Various organic organic anti-fading agents and metal complex anti-fading agents can be used as the anti-fading agents. Examples of the organic anti-fading agent include hydroquinones, alkoxyphenols, dialkoxyphenols, phenols, anilines, amines, indans, chromanes, alkoxy anilines, and heterocycles. Examples of the metal complex include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the ink composition is preferably from 0.02 weight % to 1.00 weight %.

The pH adjuster is not specifically limited as long as the pH adjuster can set a pH value of the ink composition to a desired value without exerting an adverse influence on the ink composition to which the pH adjuster is added. The pH adjuster may be selected appropriately in accordance with the purpose. Examples of the pH adjuster include alcohol amines such as diethanlol amine, triethanol amine, or 2-amino-2-ethyl-1,3-propanediol; alkali metal hydroxides such as lithium hydroxide, sodium hydroxide, or potassium hydroxide; ammonium hydroxides such as ammonium hydroxide or quaternary ammonium hydroxide; phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Properties of Ink Composition

The surface tension of the ink composition employed in the invention is preferably adjusted to a range of from 20 mN/m to 60 mN/m, more preferably from 20 mN/m to 45 mN/m, and still more preferably from 25 mN/m to 40 mN/m, from the viewpoint of ejection stability when the ink composition is applied to inkjet recording system.

The viscosity of the ink composition employed in the invention at 20° C. is preferably from 1.2 mPa·s to 15.0 mPa·s, more preferably from 2 mPa·s to less than 13 mPa·s and still more preferably from 2.5 mPa·s to less than 10 mPa·s.

Coagulation Liquid

In embodiments, the ink set of the invention further preferably includes a coagulation liquid in addition to the ink composition and the maintenance liquid from the viewpoint to obtaining high quality images.

The coagulation liquid contains at least the coagulation accelerator which causes coagulation of the ink composition, and, as required, can further contain other components.

Coagulation Accelerator

The coagulation liquid contains at least one coagulation accelerator capable of forming a coagulate when contacting the ink composition. When the ink composition and the coagulation liquid are mixed on the recording medium, coagulation of the pigments and the like that have been stably dispersed in the ink composition can be enhanced.

The coagulation accelerator in the invention preferably contains at least one selected from a cationic polymer, an acidic compound, and a polyvalent metal salt from the viewpoint of the quality of an image to be formed.

Polymers having a primary-, secondary- or tertiary-amino group or a quaternary ammonium salt group as the cationic group can be preferably used as the cationic polymer.

Preferable examples of the cationic polymer include: polymers that are obtained as a homopolymer of a monomer (cationic monomer) having a primary-, secondary- or tertiary-amino group, salts thereof, or a quaternary ammonium salt group; and polymers that are obtained as a copolymer or a condensation polymer of the cationic monomer and other monomer (hereinafter sometimes referred to as a "non-cationic monomer"). The polymers can be used in any form of a water-soluble polymer or water dispersible latex particles.

Examples of the monomer (cationic monomer) include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride;

trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate;

a substance of N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, or N,N-diethylamino propyl(meth)acrylamide quaternized with methyl chloride, ethyl chloride, methyl bromide, ethyl bromide, methyl iodide or ethyl iodide, and a sulfonate, an alkyl sulfonate, an acetate or an alkyl carboxylate thereof in which an anion therein is substituted.

Specific examples of the cationic monomer include monomethyl diallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy) ethyl ammonium chloride, trimethyl-3-(methacryloyloxy) propyl ammonium chloride, trimethyl-3-(methacryloyloxy) propyl ammonium chloride, trimethyl-2-(methacryloyl amino)ethyl ammonium chloride, triethyl-2-(methacryloyl amino)ethyl ammonium chloride, trimethyl-2-(acryloylamino)ethyl ammonium chloride, triethyl-2-(acryloylamino)ethyl ammonium chloride, trimethyl-3-(methacryloyl amino)propyl ammonium chloride, triethyl-3-(methacryloyl amino)propyl ammonium chloride, trimethyl-3-(acryloylamino)propyl ammonium chloride, triethyl-3-(acryloylamino)propyl ammonium chloride;

N,N-dimethyl-N-ethyl-2-(methacryloyloxy)ethyl ammonium chloride, N,N-diethyl-N-methyl-2-(methacryloyloxy) ethyl ammonium chloride, N,N-dimethyl-N-ethyl-3-(acryloylamino)propyl ammonium chloride, trimethyl-2-(methacryloyloxy)ethylammonium bromide, trimethyl-3-(acryloylamino)propyl ammonium bromide, trimethyl-2-(methacryloyloxy)ethylammonium sulfonate, and trimethyl-3-(acryloylamino)propyl ammonium acetate.

Examples of the monomer which is copolymerizable further include N-vinylimidazole and N-vinyl-2-methylimidazol.

Moreover, allylamine, diallylamine, compounds and salts thereof, etc., can be used as the cationic monomer. Examples of such compound include allylamine, allylamine hydrochloride, allylamine acetate, allylamine sulfate, diallylamine, diallylamine hydrochloride, diallylamine acetate, diallylamine sulfate, diallylmethylamine and salts thereof (examples of the salt include hydrochloride, acetate, and sulfate), diallylethylamine and salts thereof (examples of the salts include hydrochloride, acetate, and sulfate), and diallyldimethylammonium salt (examples of counter anion of the salt include chloride, acetate ion, and sulfate ion). Since the allylamine and diallylamine compounds are inferior in polymerization properties in the form of amine, the allylamine and diallylamine compounds are generally polymerized in the form of a salt and are desalted as required.

Moreover, a vinylamine unit formed by polymerizing a unit of N-vinylacetamide or N-vinylformamide followed by hydrolysis and a salt of such a unit can be utilized as the cationic monomer.

The non-cationic monomer refers to a monomer not containing a basic portion or a cationic portion, such as primary-, secondary-, or tertiary-amino groups and salts thereof or a quaternary-ammonium-salt group.

Examples of the non-cationic monomer include alkyl (meth)acrylate; cycloalkyl(meth)acrylate such as cyclohexyl (meth)acrylate; aryl(meth)acrylate such as phenyl(meth) acrylate; aralkyl ester such as benzyl(meth)acrylate; aromatic vinyl such as styrene, vinyltoluene, or α-methyl styrene; vinyl ester such as vinyl acetate, vinyl propionate, or vinyl versatate; allyl ester such as allyl acetate; halogen containing monomers such as vinylidene chloride or vinyl chloride; vinyl cyanide such as (meth)acrylonitrile; and olefin such as ethylene or propylene.

Alkyl(meth)acrylates having an alkyl portion having 1 to 18 carbon atoms are preferable as the alkyl(meth)acrylate. Examples thereof include methyl(meth)acrylate, ethyl(meth) acrylate, propyl(meth)acrylate, isopropyl(meth)acrylate, n-butyl(meth)acrylate, isobutyl(meth)acrylate, t-butyl(meth) acrylate, hexyl(meth)acrylate, octyl(meth)acrylate, 2-ethylhexyl(meth)acrylate, lauryl(meth)acrylate, and stearyl(meth) acrylate.

Among the above, methylacrylate, ethylacrylate, methylmetaacrylate, ethylmethacrylate, and hydroxyethylmethacrylate are preferable.

The non-cationic monomers can be used singly or in combination of two or more thereof.

Preferable examples of the cationic polymer include polydiallyldimethylammonium chloride, polymethacryloyloxyethyl-β-hydroxyethyldimethylammonium chloride, polyethyleneimine, polyallylamine and compounds thereof, polyamide-polyamine resin, cationated starch, a dicyandiamide formalin condensate, a dimethyl-2-hydroxypropyl ammonium salt polymer, polyamidine, polyvinylamine, a dicyan cationic resin typified by a dicyandiamide-formalin polycondensate, a polyamine cationic resin typified by a dicyanamide-diethyltriamine polycondensate, an epichlorohydrin-dimethylamine addition polymer, a dimethyldiallylammonium chloride-SO$_2$ copolymer, a diallylamine salt-SO$_2$ copolymer, a (meth)acrylate-containing polymer having an alkyl group substituted with a quaternary ammonium salt group in an ester portion, and a styryl polymer having an alkyl group substituted with a quaternary ammonium salt group.

Specific examples of the cationic polymer include substances described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, 4,115,124, 4,124,386, 4,193,800, 4,273,853, 4,282,305, and 4,450,224, JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314, JP-B Nos. 5-35162, 5-35163, 5-36164, and 5-88846, JP-A Nos. 7-118333 and 2000-344990, and Japanese Patent Nos. 2648847 and 2661677. Among the above, the diallyldimethylammonium chloride polymer or the (meth)acrylate-containing polymer having a quaternary ammonium salt group in the ester portion are preferable.

Examples of the cationic polymer further include a copolymer containing at least an epihalohydrin compound and an amine compound.

The cationic polymer employed in the invention is preferably a copolymer formed by copolymerizing at least an epihalohydrin compound and an amine compound from the viewpoint of increasing coagulation rate.

Specific examples of the copolymer formed by copolymerizing at least an epihalohydrin compound and an amine compound include a copolymer of monomethylamine, monoethylamine, dimethylamine, or diethylamine and epichlorohydrin. Copolymers having a molecular weight being further increased by addition of polyalkylene polyamine in addition to alkylamine/epichlorohydrin can be also preferable as the copolymer. Examples of the polyalkylene polyamine include diethylenetriamine, triethylenetetramine, and pentaethylenehexamine.

The weight average molecular weight of the cationic polymer is preferably from about 1000 to about 50000.

The cationic polymers may be used singly or in combination of two or more thereof.

The coagulation liquid employed in the invention can contain a water-based solvent (e.g., water) in addition to the cationic polymer.

The content of the cationic polymer in the coagulation liquid is preferably 5 weight % to 95 weight %, and more preferably 10 weight % to 80 weight %, based on the total amount of the coagulation liquid from the viewpoint of coagulation effects.

Examples of the coagulation liquid containing an acidic compound include a liquid that can generate a coagulate by changing the pH of the ink composition. Herein, the pH of the coagulation liquid at 25° C. is preferably 1 to 6, more preferably 2 to 5, and still more preferably 3 to 5 from the viewpoint of the coagulation rate of the ink composition. Herein, the pH of the ink composition used in the jetting process at 25° C. is preferably 7.5 or more, and more preferably 8 or more.

In particular, in preferable embodiments, the pH (25° C.) of the ink composition is 7.5 or more and the pH (25° C.) of the coagulation liquid is 3 to 5 from the viewpoint of improvements in image density and image resolution, and increasing ink jet recording rate.

The components for the coagulation can be used singly or in combination of two or more.

The coagulation liquid can be formed of the coagulation accelerator by using at least one acidic compound. Examples of the acidic compound include compounds having a phosphate group, a phosphonic acid group, a phosphinic acid group, a sulfuric acid group, a sulfonic acid group, a sulfinic acid group, or a carboxyl group, or salts thereof (e.g., polyvalent metal salts). Among the above, from the viewpoint of the coagulation rate of the ink composition, the compounds having a phosphonic acid group or a carboxyl group are more preferable, and the compounds having a carboxyl group are still more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyronecarboxylic acid, pyrrolecarboxylic acid, furancarboxylic acid, pyridinecarboxylic acid, coumalic acid, thiophenecarboxylic acid, nicotinic acid, modified compounds thereof, and salts thereof (e.g., polyvalent metal salts). These compounds may be used singly or in combination of two or more thereof.

The content of the acidic compound in the coagulation liquid is preferably from 5 weight % to 95 weight %, and more preferably from 10 weight % to 80 weight %, with respect to the total amount of the coagulation liquid from the viewpoint of the coagulation effects.

One preferable example of the coagulation liquid that improves high-speed coagulation properties include a coagulation liquid to which a polyvalent metal salt is added. Examples of the polyvalent metal salt include alkaline earth metals of the second group of the periodic table (e.g., magnesium and calcium), the transition metals of the third group of the periodic table (e.g., lanthanum), cation of the 13th group of the periodic table (e.g., aluminum), and salts of lanthanides (e.g., neodymium). Carboxylate (formic acid, acetic acid, benzoate, etc.), nitrate, chloride, and thiocyanate are preferable as the salts of metals. Among the above, calcium salts or magnesium salts of carboxylic acid (formic acid, acetic acid, benzoate, etc.), calcium salts or magnesium salts of nitric acid, calcium chloride, magnesium chloride, and calcium salts or magnesium salts of thiocyanic acid are preferable.

The content of the salts of metals in the coagulation liquid is preferably in the range of 1 weight % to 10 weight %, more preferably in the range of 1.5 weight % to 7 weight %, and still more preferably in the range of 2 weight % to 6 weight %.

The viscosity of the coagulation liquid is preferably in the range of 1 mPa·s to 30 mPa·s, more preferably in the range of 1 mPa·s to 20 mPa·s, still more preferably in the range of 2 mPa·s to 15 mPa·s, and particularly preferably in the range of 2 mPa·s to 10 mPa·s from the viewpoint of the coagulation rate of the ink composition. The viscosity is measured under the conditions of a temperature of 20° C. using VISCOMETER TV-22 (trade name, manufactured by TOKI SANGYO CO. LTD).

The surface tension of the coagulation liquid is preferably 20 mN/m to 60 mN/m, more preferably 20 mN/m to 45 mN/m, and still more preferably 25 mN/m to 40 mN/m from the viewpoint of the coagulation rate of the ink composition. The surface tension is measured under the conditions of a temperature of 25° C. using AUTOMATIC SURFACE TENSIOMETER CBVP-Z (trade name, manufactured by Kyowa Interface Science Co., LTD.).

In preferable embodiments, the ink set of the invention employs a combination of: as an ink composition, a pigment at a content of 0.1 to 15 weight % (more preferably 0.5 to 12 weight %) with respect to the total ink composition, and a pigment dispersant contained at a content of 25 to 140 parts by weight (more preferably from 25 to 50 parts by weight) with respect to 100 parts by weight of the pigment; and as a maintenance liquid, a solvent having an SP value of 27.5 or less at a content of 50 weight % or more (more preferably 80% or more) with respect to the total solvent content. In more preferable embodiments, the ink set of the invention further employs a coagulation liquid including a coagulation agent at a content of from 1 to 95 weight % in addition to the above combination.

Image-Forming Method

The image forming method, which is one aspect of the invention, is a method in which an image is formed using the ink set described above.

This image forming method is not particularly limited as long as it uses the ink set. In preferable embodiments, the image forming method includes at least: applying, with a liquid applying device, the ink composition to a recording medium (ink application process); and applying a maintenance liquid to the liquid applying device (maintenance liquid application process), and may further include applying a coagulation liquid to the recording medium (coagulation liquid application process). The image forming method of the invention may further include other processes such as a drying/removal process or a thermal fixing process as appropriate according to necessity.

Application of Ink

Any known liquid application methods can be used without limitation in the applying of the ink composition performed in the invention. Examples of the liquid application method include application of ink using a common writing material, application of ink using a pen plotter, and application of ink by an ink jet method. From the viewpoint of high-speed recordability, the application of the ink composition is preferably performed by an inkjet method.

Inkjet recording method which can be employed in the invention may include imparting energy to an inkjet recording ink (ink composition) to form an image on a known image receiving material such as plain paper, resin coated paper, inkjet paper such as those described in JP-A-Nos. 8-169172, 8-27693, 2-276670, 7-276789, 9-323475, 62-238783, 10-153989, 10-217473, 10-235995, 10-217597 or 10-337947, a film, electrophotographic common paper, fabrics, glass, metal or ceramics. In embodiments, the inkjet recording method described in the paragraphs 0093 to 0105 of JP-A No. 2003-306623 can be employed as a preferable inkjet recording method in to the invention.

As the ink jet head used in the ink jet method as the liquid applying device (hereinafter simply referred as "head"), a known ink jet head may be used. Either a continuous type head or a dot-on-demand type head can be used. Of dot-on-demand type heads, a head having an operation valve at a thermal head for jetting, such as that disclosed in Japanese Patent Application Laid-Open (JP-A) No. 9-323420, is preferable. Examples of piezo heads include those described in European Patent Application Publication Nos. 0277703 A1 and 0278590 A1. It is preferable that the head has a temperature adjustment function to so that the temperature of the ink may be controlled. In the ink jetting, it is preferable to control the temperature of the ink so that an amount of change in viscosity of the ink is ±5%. It is preferable that operation is performed at a drive frequency from 1 kHz to 500 kHz. It is not necessary for the shape of the nozzle to be circular, and any shape, such as an elliptical or square shape, may be used. It is preferable that the nozzle diameter is within a range from 10 μm to 100 μm. Further, it is not necessary for the nozzle opening portions themselves to be perfectly circular. If they are not perfectly circular, then the term "nozzle diameter" indicates the diameter of a circle having the same area as the area of the nozzle opening portion.

In the ink jetting process, to adjust the temperature of the ink at a time of jetting and to improve wipeability, the temperature of the ink at a time of jetting is preferably 30° C. or more, and more preferably 35° C. or more. For ink stability and jetting reliability, the temperature of the ink is preferably 70° C. or lower.

In order to reduce ink adhesion, it is preferable that the surface of the nozzles is treated with an ink-repellant. By coating the nozzles with a perfluoro polymer such as PTFE, PFA or FEP, a particularly excellent liquid repellant function can be obtained.

Application of Maintenance Liquid

In the application of the maintenance liquid, the maintenance liquid is applied to the vicinity of the head, an ink flow path, and the like (hereinafter referred to as "head and the like") in order to remove solidified ink from a nozzle surface of a head. The application of the maintenance liquid to the head and the like may enable to easily make solidified ink at a nozzle surface derived from ink be dissolved or swelled to be easily removed.

Substances derived from solidified ink may be removed by scraping with a blade or wiping with a cloth or paper before or after applying the maintenance liquid. Preferable examples of the removal of solidified ink include: scraping off of solidified ink by abrading (wiping) a nozzle head with a wiper blade after applying a maintenance liquid; and removal of solidified ink by air pressure or liquid pressure of a maintenance liquid or the like; and wiping with a cloth or paper. In particular, scraping with a blade and wiping with a cloth or paper are preferable.

The material of the wiper blade is preferably an elastic rubber. Specific examples of the material include butyl rubber, chloroprene rubber, ethylene propylene rubber, silicone rubber, urethane rubber, and nitrile rubber. A wiper blade coated with a fluororesin or the like for imparting ink repellance may be used in the image forming method of the invention.

Since the specific ink composition described above is used, solidified ink at a nozzle surface derived from an ink composition can be easily scraped off as a solid in the image forming method of the invention.

The image forming method of the invention may further include a process in which an image is fixed by heating a recording medium (thermal fixing), after forming an image by jetting ink onto the recording medium in an ink application process.

The method of the drying/removing it not particularly limited as long as it includes drying and removing an ink solvent (water or a solvent) included in an ink composition jetting to the recording medium, and may be appropriately selected according to the desired purpose.

The method of the thermal fixing is not particularly limited as long as it includes softening polymer particles included in an ink composition and imparting scratch resistance to an image, and may be appropriately selected according to the desired purpose.

The recording medium used in the invention is not particularly limited, and specific examples thereof include plain paper, bond paper, coated paper and the like.

Application of Coagulation Liquid

In preferable embodiments, the coagulation liquid for coagulating components in the ink composition is supplied onto the recording medium before or after the application of the ink composition so as to have the ink composition and the coagulation liquid contact with each other to form an image.

In preferable embodiments, the image forming method of one aspect of the invention includes applying the ink composition onto an image recording medium after the application of the coagulation liquid. In other words, in preferable embodiments, apply the coagulation liquid for coagulating particles of pigment or the like included in the ink composition is applied on the recording medium in advance, and then applying the ink composition such that it contacts a coagulation system which is formed by the coagulation liquid on the recording medium, thereby forming an image. Thereby, the speed of ink jet recording can be increased, and an image having a high density and high resolution can be obtained even when recording is performed at a high speed.

In embodiments, the ink jet recording method of one aspect of the invention may employ an intermediate transfer body as an a recording medium on which an image is to be recorded first. Namely, in embodiments, the ink jet recording method of one aspect of the invention include: applying, onto an intermediate transfer body, the ink composition employed in the invention, by an ink jet method; applying, onto an intermediate transfer body, a coagulation liquid capable of forming a coagulate on the intermediate transfer body when contacting the ink composition, so as to have the ink composition and the coagulation liquid are brought into contact with each other to form an image on the intermediate transfer body; and transferring the thus-formed image on the intermediate transfer body to a recording medium desired as a final recorded media. Also in this case, the jetting of the ink composition is performed after the application of the jetting of the coagulation liquid.

EXAMPLES

Hereinafter, the invention will be described in more detail with reference to examples, although the invention is not limited to the examples. "Parts" and "%" indicate quantities in terms of weight, unless otherwise specified.

The weight average molecular weight of the resin was herein measured by gel permeation chromatography (GPC). In the GPC, the measurement is carried out by the use of HLC-8020GPC (trade name, manufactured by Tosoh Corporation), three columns of TSK GEL, SUPER MULTIPORE HZ-H (trade name, manufactured by Tosoh Corporation; 4.6 mmID×15 cm) as columns, and THF (tetrahydrofuran) as an elute. The measurement was performed using an IR detector under the conditions of a sample concentration of 0.35 weight %, a flow rate of 0.35 ml/min., an injection amount of sample of 10 μl, a measurement temperature of 40° C. Calibration curves was prepared by eight samples of "REFERENCE SAMPLE TSK STANDARD, POLYSTYRENE" of "F-40", "F-20", "F-4", "F-1", "A-5000", "A-2500", "A-1000" and "n-propylbenzene" (all trade names, manufactured by Tosoh Corporation).

Example 1

Preparation of Ink

Synthesis of Polymer Dispersant P-1

A polymer dispersant P-1 was synthesized according to the following scheme.

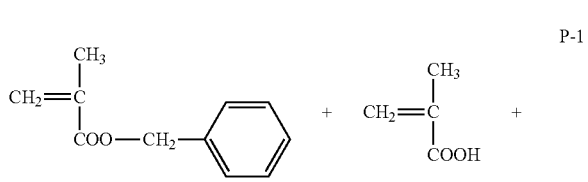

-continued

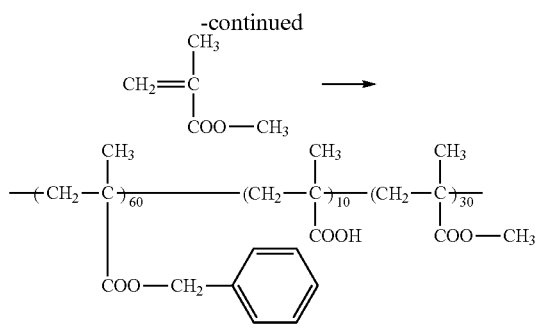

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a solution. The solution is added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at this temperature for 4 hours. The obtained reaction solution was reprecipitated twice with an excess quantity of hexane, and the precipitated resin was dried to obtain 96 g of the polymer dispersant P-1.

The formulation of the obtained resin was identified with 1H-NMR. The weight average molecular weight (Mw) was determined by a GPC method, and was found to be 44,600. Furthermore, the acid value of the polymer was obtained in accordance with the method described in JIS Standard (JIS-K0070 (1992), the disclosure of which is incorporated by reference herein), and was found to be 65.2 mgKOH/g.

Dispersion of Pigment-Containing Resin Particles 10 parts by mass of pigment blue 15:3 (trade name: PHTHALOCYANINE BLUE A220, manufactured by Dainichiseika Color & Chemicals Mfg. Co., Ltd.), 5 parts by mass of the polymer dispersant P-1, 42 parts by mass of methyl ethyl ketone, 5.5 parts of an aqueous solution of NaOH (1 mol/L), and 87.2 parts of ion-exchanged water were mixed, and the mixture was dispersed with a bead mill for 2 to 6 hours using zirconia beads with a diameter of 0.1 mm.

Methyl ethyl ketone was removed from the obtained dispersion at 55° C. under reduced pressure, and a part of the water was removed, whereby a dispersion containing pigment-containing resin particles with a pigment concentration of 10.2 weight % was obtained.

Synthesis and Preparation of Self-Dispersible Polymer Particles Synthesis of Self-Dispersible Polymer Particles B-1

360.0 g of methyl ethyl ketone was placed in a 2 L three necked flask equipped with a stirrer, a thermometer, a reflux condenser tube, and a nitrogen gas introducing pipe, and the temperature was raised to 75° C. Thereafter, while maintaining the temperature inside the flask at 75° C., a mixed solution containing 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Ind. Ltd.) was added dropwise at a constant rate so that the dropwise addition was completed in 2 hours. After completion of the dropping, a solution containing 0.72 g of V-601 (described above) and 36.0 g of methyl ethyl ketone was added, and stirred at 75° C. for 2 hours. Further, a solution containing 0.72 g of V-601 (described above) and 36.0 g of isopropanol was added, and stirred at 75° C. for 2 hours. Thereafter, the temperature was raised to 85° C., and the stirring was continued for further 2 hours, thereby obtaining a resin solution of a phenoxy ethyl acrylate/methyl methacrylate/acrylic acid (=50/45/5 [mass ratio]) copolymer.

The weight average molecular weight (Mw) of the obtained copolymer was 64,000 (calculated by gel permeation chromatography (GPC) in terms of polystyrene) and the acid value was 38.9 (mgKOH/g).

Next, 668.3 g of the obtained resin solution was weighed, and 388.3 g of isopropanol and 145.7 ml of aqueous 1 mol/L NaOH solution were added. Then, the temperature inside the reactor was raised to 80° C. Next, 720.1 g of distilled water was added dropwise at a rate of 20 ml/min so that the copolymer resin is dispersed in water. Thereafter, the resultant was held under an atmospheric pressure at a temperature inside the reactor of 80° C. for 2 hours, and then maintained at 85° C. for 2 hours, and then further maintained at 90° C. for 2 hours. Then, the pressure inside the reactor was reduced, and the isopropanol, methyl ethyl ketone, and distilled water were distilled off in the total amount of 913.7 g, to provide a water dispersion of the self-dispersible polymer particles B-1 having a solid content of 28.0 weight %.

Preparation of Cyan Ink

A cyan ink was prepared to have the following formulation by mixing the dispersion of resin-coated pigment particles, the water dispersion of the self-dispersible polymer particles B-1, a hydrophilic organic solvent, a surfactant, and ion exchange water so as to have the following formulation and then filtrating with a membrane filter having a pore size of 5 μm.

Formulation of Cyan Ink

| | |
|---|---|
| Cyan pigment (pigment•blue 15:3) | 4 weight % |
| Polymer dispersant P-1 | 2 weight % |
| Self-dispersible polymer particles B-1 (solid content) | 8 weight % |
| Compound 1 represented by the following Structural formula (1) (In Structural formula (1), AO is ethyleneoxy unit, and l + m + n is about 6; SP value: 23.2) | 15 weight % |
| OLFINE E1010 (trade name, manufactured by Nissin Chemical Industry, Inc., Surfactant) | 1 weight % |
| Ion exchange water | balance to adjust the total amount of the composition to 100 parts |

The viscosity, surface tension, and pH (25±1° C.) of the cyan ink (ink composition) were measured to turn out to be 4.8 mPa·s, 35.4 mN/m, and 8.5, respectively. The measurement of the viscosity was performed using VISCOMETER TV-22 (trade name, manufactured by Toki Sangyo Co., Ltd.) at 25° C. The measurement of the surface tension was performed under the conditions of a temperature of 25° C. using an automatic surface tensiometer CBVP-Z (trade name, manufactured Kyowa Interface Science Co., LTD.). The pH was measured at 25±1° C.

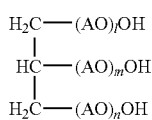

Structural formula (1)

Preparation of Coagulation Liquid

Components shown in the following formulation was mixed to prepare a coagulation liquid. The viscosity, surface tension, and pH (25±1° C.) of the coagulation liquid were measured to turn out to be 4.9 mPa·s, 24.3 mN/m, and 1.5, respectively. The measurement of the viscosity, surface tension, and pH were performed in the same manner as those for the ink composition.

Formulation of Coagulation Liquid:

| | |
|---|---|
| Dimethylamine/Epichlorohydrin copolymer (Polymerization ratio 1:1, Weight average molecular weight 6000) | 5 weight % |
| Diethylene glycol monoethyl ether (manufactured by Wako Pure Chemical Ind. Ltd.) | 20.0 weight % |
| ZONYL FSN-100 (trade name, manufactured by DuPont) | 1.0 weight % |
| Ion exchange water | 74 weight % |

Preparation of Maintenance Liquid

Components shown in the following formulation was mixed to prepare a maintenance liquid. The viscosity, surface tension, and pH (25±1° C.) of the maintenance liquid were measured to turn out to be 2.8 mPa·s, 31.6 mN/m, and 8.3, respectively. The measurement of the viscosity, surface tension, and pH were performed in the same manner as those for the ink composition.

Formulation of Maintenance Liquid:

| | |
|---|---|
| Diethylene glycol monobutyl ether (DEGmBE) (solvent, manufactured by Wako Pure Chemical Ind. Ltd.) | 25.0 weight % |
| Sodium oleate (surfactant, manufactured by DuPont) | 1.0 weight % |
| Ion exchange water | 74 weight % |

Image Formation and Evaluation

A sheet of TOKUBISHI ART RYOMEN N (trade name, manufactured by Mitsubishi Seishi Co., basis weight: 84.9 g/m$^2$) was placed in a fixing manner on a stage which is transferable in a predetermined direction at 500 mm/sec. The coagulation liquid was coated onto the sheet with a wire bar coated so as to make the thickness of the coated film be about 5 μm, and the coated film is subjected to drying at 50° C. for 2 seconds immediately after the coating, so as to provide an image recording medium.

DIMATIX MATERIAL PRINTER DMP-2831 (trade name, manufactured by Fuji Film Dimatix Inc.) that was equipped with a 10 pl ejection cartridge formed by modifying DMC-11610 (trade name, manufactured by Fuji Film Dimatix Inc.) to allow liquid supply from the outside was used as an inkjet recording apparatus. Jetting of the cyan ink (printing) on the recording medium in an ink coating amount of 5 g/m$^2$ was continuously performed for 60 minutes. 10 minutes pause was placed after the completion of the 60 minutes-jetting. Then, the maintenance liquid was applied to a nozzle surface of an ink jet head, the nozzle surface was wiped with a wiper blade formed of hydrogenated NBR. Subsequently, jetting of the cyan ink was performed again. The thus-formed printed sheet was heated for 3 minutes to provide a sample to be subjected for the following evaluations.

Evaluation of Curling Property

The recording medium on which a solid image was printed with the cyan ink in an ink coating amount of 5 g/m$^2$ was cut to be a strip having a size of 5 mm×50 mm such that the length direction of the strip is in the direction of curl, and the strip was allowed to stand for 24 hours at a temperature of 25° C. and a relative humidity of 60%. Then, a curling behavior (curl value) was measured. The evaluation results are shown in Table 1.

Evaluation Criteria

A: Curvature C does not exceed 15
B: Curvature C exceeds 15, but is 20 or lower.
C: Curvature C exceeds 20, but is 25 or lower.
X: Curvature C exceeds 25.

Method of Measuring Curvature

The sample strip having a size of 5 mm×50 mm, the length of 50 mm being in the curling direction, was measured with a curl measurement plate, and a curl value (C) was read. The curl of the sample was regarded as an arc of a circle with a radius of R, and the curl was calculated according to the equation of $C=1/R(m)$.

Rub Resistance

Unprinted sheet of TOKUBISHI ART (described above) was cut into 10 mm×50 mm and used to wrap around a paperweight (weight: 470 g, size: 15 mm×30 mm×120 mm) so as to make a contact area of the cut sheet of the unprinted TOKUBISHI ART (described above) and a sample to be evaluated be 150 mm$^2$. The printed sample prepared for the evaluation of curling property was rubbed with the wrapped paperweight back-and-forth three times, the load applied to the sample by this operation being equivalent to 260 kg/m$^2$. The printed surface of the sample after being rubbed was visually observed, and rub resistance of the sample was evaluated according to the following evaluation criteria.

Evaluation Criteria

A: No erase of the image (color material) from the printed surface was visually observed. Further, no coloring of the unprinted sheet wrapping the paperweight was observed.

B: Almost no erase of the image (color material) from the printed surface was visually observed. A slight degree of coloring of the unprinted sheet wrapping the paperweight was observed.

C: Erase of the image (color material) from the printed surface occurred in 5% or less of the image area.

X: Erase of the image (color material) from the entire of the printed surface occurred in more than 5% of the image area.

Image Quality (Avoidance of Interference Between Jetting Droplets)

The sample having a printed image with a size of 5 cm×5 cm was dried, and was fixed by heating at 100° C. for 10 seconds. Thereafter, the image quality (avoidance of interference between jetting droplets) was evaluated according to the following evaluation criteria.

Evaluation Criteria

A: No image unevenness was visually observed.
B: Almost no image unevenness was visually observed.
C: Partial image unevenness was observed.
X: Image unevenness was visually observed in the entire of the image.

Maintenance Property

An ink was jetting from a nozzle surface of an ink jet head, and then wiping of the nozzle surface was performed by a wiper blade formed of hydrogenated NBR. The jetting and the wiping were performed under each of the conditions (1) to (3), and whether the re-jetting property of the ink is satisfactory or not was judged based on the results of the re-jetting. Subsequently, maintenance property was evaluated according to the following evaluation criteria. The results are shown in Table 1.

(1) When the ink jetting ratio, which was measured after performing blade wiping once immediately after completion of continuous jetting of the ink over 60 minutes, was 90% or more, the ink was evaluated as being satisfactory with respect to the condition (1).

(2) When the ink jetting ratio, which was measured after performing blade wiping once at 30 minutes after stopping jetting of the ink continued over 1 minute, was 90% or more, the ink was evaluated as being satisfactory with respect to the condition (2).

(3) When no unevenness was observed in an image formed after blade wiping was performed once immediately after completion of continuous jetting of an ink over 10 minutes, the ink was evaluated being satisfactory with respect to the condition (3).

Measurement of Ink Jetting Ratio

All the nozzles were confirmed as being jetting ink when the experiments were started. Then, the number of jetting nozzles after completion of the experiments including the maintenance process was counted, and the jetting ratio was calculated as follows.

Jetting ratio (%)=(Number of nozzles capable of jetting after maintenance)/(number of all nozzles)×100

Evaluation Criteria
A: Satisfactory in three conditions
B: Satisfactory in two conditions
C: Satisfactory in one condition
X: Unsatisfactory in three conditions Examples 2 to 11 and Comparative Examples 1 to 5

Ink compositions and maintenance liquids of Examples 2 to 11 and Comparative examples 1 to 5 were prepared and evaluated in the similar manner as those in Example 1, except that the amount and the kind of the solvent and the surfactant used for preparation of the maintenance liquid were changed to those shown in Tables 1 to 4, the amount and the kind of the solvent having the SP value of 27.5 or less and the polymer particles used for preparation of the ink composition were changed to those shown in Tables 1 to 4, and the use of the coagulation liquid was changed as shown in Tables 1 to 4. In Tables 1 to 4, "SO" means sodium oleate; "C1" means Compound 1; "AA" means acetonylacetone; "GL" means glycerin; "TG" means triethylene glycol; "2-Py" means 2-pyrrorodone; and "TMP" means trimethylol propane.

TABLE 1

|  |  | Example 1 | Example 2 | Example 3 |  | Example 4 | Example 5 | Example 6 |
|---|---|---|---|---|---|---|---|---|
| Maintenance liquid | Solvent | DEGmBE | DPG | TEGmBE | DEG | DEGmBE | DEGmBE | DEGmBE |
|  | SP value | 21.5 | 27.2 | 21.1 | 30.6 | 21.5 | 21.5 | 21.5 |
|  | Content (%) | 25 | 30 | 12 | 8 | 25 | 25 | 25 |
|  | Content of solvent (SP ≦ 27.5) with respect to total solvent (%) | 100 | 100 | 60 |  | 100 | 100 | 100 |
|  | Content of solvent (SP ≦ 24) with respect to total solvent (%) | 100 | 0 | 60 |  | 100 | 100 | 100 |
|  | Surfactant | SO | — | OLFIN E1010 |  | — | SO | SO |
|  | Surfactant content (%) | 1 | 0 | 1 |  | 0 | 1 | 1 |
| Ink composition | Pigment dispersant (iii) | P-1 | P-1 | P-1 |  | P-1 | P-1 | P-1 |
|  | Solvent | C1 | C1 | C1 |  | C1 | C1 | C1 |
|  | (SP value and Content (%)) | (23.2, 15%) | (23.2, 15%) | (23.2, 15%) |  | (23.2, 15%) | (23.2, 15%) | (23.2, 15%) |
|  | Content of solvent (SP ≦ 27.5) with respect to total solvent (%) | 100 | 100 | 100 |  | 100 | 100 | 100 |
|  | Polymer particles (iv) | B-1 | B-1 | B-1 |  | B-1 | — | B-1 |
|  | Solid ratio of (i)/{(iii) + (iv)} | 0.4 | 0.4 | 0.4 |  | 0.4 | 2 | 1.2 |
|  | Coagulation agent | Exist | Exist | Exist |  | None | Exist | Exist |
| Evaluation | Maintainability | A | B | B |  | A | A | A |
|  | Scratch resistance | A | A | A |  | A | B | B |
|  | Image quality | A | A | A |  | B | B | B |
|  | Curl | A | A | A |  | B | A | A |

TABLE 2

|  |  | Example 7 | Example 8 | Example 9 | Example 10 |  |
|---|---|---|---|---|---|---|
| Maintenance liquid | Solvent | DEGmBE | DEGmBE | DEGmBE | DEGmBE | TEG |
|  | SP value | 21.5 | 21.5 | 21.5 | 21.5 | 27.8 |
|  | Content (%) | 25 | 25 | 25 | 12 | 10 |
|  | Content of solvent (SP ≦ 27.5) with respect to total solvent (%) | 100 | 100 | 100 | 54 |  |
|  | Content of solvent (SP ≦ 24) with respect to total solvent (%) | 100 | 100 | 100 | 54 |  |
|  | Surfactant | SO | SO | SO | SO |  |
|  | Surfactant content (%) | 1 | 1 | 1 | 1 |  |
| Ink composition | Pigment dispersant (iii) | P-1 | P-1 | P-1 | P-1 |  |
|  | Solvent | C1 | C1 (23.2, 20%)) | C1 (23.2, 12%) | C1 (23.2, 12%) |  |
|  | (SP value and Content (%)) | (23.2, 15%) | GL (33.5, 5%) | GL (33.5, 8%) | GL (33.5, 8%) |  |
|  | Content of solvent (SP ≦ 27.5) with respect to total solvent (%) | 100 | 80 | 60 | 60 |  |

TABLE 2-continued

|  |  | Example 7 | Example 8 | Example 9 | Example 10 |
|---|---|---|---|---|---|
|  | Polymer particles (iv) | B-1 | B-1 | B-1 | B-1 |
|  | Solid ratio of (i)/{(iii) + (iv)} | 0.8 | 0.4 | 0.4 | 0.4 |
|  | Coagulation agent | Exist | Exist | Exist | None |
| Evaluation | Maintainability | A | A | A | B |
|  | Scratch resistance | B | B | B | A |
|  | Image quality | A | A | A | A |
|  | Curl | A | A | B | A |

TABLE 3

|  |  | Example 11 | Comp. 1 | Comp. 2 |  |  |  |  |  |
|---|---|---|---|---|---|---|---|---|---|
| Maintenance liquid | Solvent | DEGmBE | TEG | AA | GL | TG | 2-Py | TMP | TEGmBE |
|  | SP value | 21.5 | 27.8 | 21.5 | 33.5 | 27.8 | 25.9 | 30.9 | 21.1 |
|  | Content (%) | 25 | 15 | 25 | 10 | 5 | 5 | 5 | 3 |
|  | Content of solvent (SP ≦ 27.5) with respect to total solvent (%) | 100 | 100 |  |  | 39 |  |  |  |
|  | Content of solvent (SP ≦ 24) with respect to total solvent (%) | 100 | 0 |  |  | 24.2 |  |  |  |
|  | Surfactant | SO | — |  |  | — |  |  |  |
|  | Surfactant content (%) | 1 | 0 |  |  | 0 |  |  |  |
| Ink composition | Pigment dispersant (iii) | P-1 | P-1 | P-1 |  |  |  |  |  |
|  | Solvent (SP value and Content (%)) | C1 (23.2, 15%) | C1 (23.2, 15%) | C1 (23.2, 15%) |  |  |  |  |  |
|  | Content of solvent (SP ≦ 27.5) with respect to total solvent (%) | 100 | 100 | 100 |  |  |  |  |  |
|  | Polymer particles (iv) | B-2 | B-2 | B-1 |  |  |  |  |  |
|  | Solid ratio of (i)/{(iii) + (iv)} | 0.4 | 0.4 | 0.4 |  |  |  |  |  |
|  | Coagulation agent | Exist | None | None |  |  |  |  |  |
| Evaluation | Maintainability | A | C | C |  |  |  |  |  |
|  | Scratch resistance | A | B | A |  |  |  |  |  |
|  | Image quality | B | X | X |  |  |  |  |  |
|  | Curl | A | B | A |  |  |  |  |  |

TABLE 4

|  |  | Comp. 3 |  | Comp. 4 | Comp. 5 |  |
|---|---|---|---|---|---|---|
| Maintenance liquid | Solvent | DPG | DEG | TEG | DEGmBE | DEG |
|  | SP value | 27.2 | 30.6 | 27.8 | 21.5 | 27.8 |
|  | Content (%) | 10 | 12 | 15 | 10 | 12 |
|  | Content of solvent (SP ≦ 27.5) with respect to total solvent (%) | 45 |  | 100 | 45 |  |
|  | Content of solvent (SP ≦ 24) with respect to total solvent (%) | 0 |  | 0 | 45 |  |
|  | Surfactant | SO |  | SO | SO |  |
|  | Surfactant content (%) | 1 |  | 1 | 1 |  |
| Ink composition | Pigment dispersant (iii) | P-1 |  | P-1 | P-1 |  |
|  | Solvent (SP value and Content (%)) | C1 (23.2, 15%) |  | GL (33.5, 15%) | GL (33.5, 15%) |  |
|  | Content of solvent (SP ≦ 27.5) with respect to total solvent (%) | 100 |  | 0 | 0 |  |
|  | Polymer particles (iv) | B-1 |  | B-1 | B-1 |  |
|  | Solid ratio of (i)/{(iii) + (iv)} | 0.4 |  | 0.4 | 1.2 |  |
|  | Coagulation agent | Exist |  | None | Exist |  |
| Evaluation | Maintainability | C |  | B | C |  |
|  | Scratch resistance | A |  | A | B |  |
|  | Image quality | C |  | X | B |  |
|  | Curl | A |  | X | A |  |

As is clear from Tables 1 to 4, the Examples using the ink set of one aspect of the invention were evaluated as excellent for each of the evaluation criteria. In contrast, the Comparative Examples were inferior in terms of maintainability and image quality.

All publications, patent applications, and technical standards mentioned in this specification are herein incorporated by reference to the same extent as if such individual publication, patent application, or technical standard was specifically and individually indicated to be incorporated by reference.

What is claimed is:

1. An ink set comprising:
   an ink composition, and a maintenance liquid to be applied to an ink jet head and not to a recording medium, wherein
   the ink composition comprises a pigment (i);
   the maintenance liquid comprises one or more solvents (ii) having a solubility parameter value of 27.5 or less;
   the content of the one or more solvents (ii) is 50 weight % or more with respect to a total solvent content of the maintenance liquid;

the pigment (i) is dispersed in the ink composition with a pigment dispersant (iii);

the ink composition further comprises a polymer particle (iv); and a ratio of the solid content of the pigment (i) relative to the sum of the solid content of the pigment dispersant (iii) and the solid content of the polymer particle (iv), in terms of weight, is 1 or less.

2. The ink set of claim 1, wherein the pigment (i) is a pigment covered with a polymer via phase inversion emulsification.

3. The ink set of claim 1, wherein the polymer particle (iv) is a self-dispersible polymer particle.

4. The ink set of claim 1, wherein the ink composition comprises one or more solvents having a solubility parameter value of 27.5 or less, and the content of the one or more solvents contained in the ink composition and having a solubility parameter value of 27.5 or less is 70 weight % or more with respect to the total solvent content of the ink composition.

5. The ink set of claim 1, further comprising a coagulation liquid comprising a coagulation accelerator which coagulates one or more components of the ink composition.

6. The ink set of claim 5, wherein the coagulation accelerator comprises at least one selected from the group consisting of an acidic compound, a cationic polymer, and a polyvalent metal salt.

7. The ink set of claim 1, wherein the maintenance liquid comprises one or more solvents having a solubility parameter value of 24 or less at a content of 50 weight % or more with respect to a total solvent content of the maintenance liquid.

8. The ink set of claim 1, wherein the maintenance liquid further comprises a surfactant.

9. A method of forming an image using the ink set of claim 1, the method comprising:

applying, with the ink jet head, the ink composition to a recording medium; and applying the maintenance liquid to the ink jet head and not to the recording medium.

10. An ink set comprising:

an ink composition, and a maintenance liquid to be applied to an ink jet head and not to a recording medium, wherein the ink composition comprises a pigment (i);

the maintenance liquid comprises one or more solvents (ii) having a solubility parameter value of 27.5 or less;

the content of the one or more solvents (ii) is 50 weight % or more with respect to a total solvent content of the maintenance liquid;

the ink composition comprises one or more solvents having a solubility parameter value of 27.5 or less; and the content of the one or more solvents contained in the ink composition and having a solubility parameter value of 27.5 or less is 70 weight % or more with respect to the total solvent content of the ink composition.

11. The ink set of claim 10, wherein the pigment (i) is dispersed in the ink composition with a pigment dispersant (iii).

12. The ink set of claim 11, wherein the pigment (i) is a pigment covered with a polymer via phase inversion emulsification.

13. The ink set of claim 10, wherein the ink composition further comprises a polymer particle (iv).

14. The ink set of claim 13, wherein the polymer particle (iv) is a self-dispersible polymer particle.

15. The ink set of claim 10, further comprising a coagulation liquid comprising a coagulation accelerator which coagulates one or more components of the ink composition.

16. The ink set of claim 15, wherein the coagulation accelerator comprises at least one selected from the group consisting of an acidic compound, a cationic polymer, and a polyvalent metal salt.

17. The ink set of claim 10, wherein the maintenance liquid comprises one or more solvents having a solubility parameter value of 24 or less at a content of 50 weight % or more with respect to a total solvent content of the maintenance liquid.

18. The ink set of claim 10, wherein the maintenance liquid further comprises a surfactant.

19. A method of forming an image using the ink set of claim 10, the method comprising:

applying, with the ink jet head, the ink composition to a recording medium; and applying the maintenance liquid to the ink jet head and not to the recording medium.

* * * * *